US008514214B2

(12) United States Patent
Arisawa

(10) Patent No.: US 8,514,214 B2
(45) Date of Patent: Aug. 20, 2013

(54) DRIVE DEVICE AND DISPLAY DEVICE

(75) Inventor: Daijiro Arisawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 195 days.

(21) Appl. No.: 13/166,494

(22) Filed: Jun. 22, 2011

(65) Prior Publication Data

US 2011/0254823 A1 Oct. 20, 2011

Related U.S. Application Data

(63) Continuation of application No. PCT/JP2009/007143, filed on Dec. 22, 2009.

(30) Foreign Application Priority Data

Dec. 22, 2008 (JP) .................................. 2008-326304

(51) Int. Cl.
*G09G 5/00* (2006.01)
*G06F 3/033* (2006.01)

(52) U.S. Cl.
USPC .......................................... 345/211; 345/100

(58) Field of Classification Search
USPC ............ 345/100, 87, 204, 211; 348/294–324
See application file for complete search history.

(56) References Cited

U.S. PATENT DOCUMENTS

| 2003/0142052 | A1* | 7/2003 | Matsumoto ..................... 345/87 |
| 2003/0184539 | A1* | 10/2003 | Onozawa et al. ............. 345/212 |
| 2007/0273412 | A1* | 11/2007 | Yoshida et al. ............... 327/108 |
| 2009/0167371 | A1 | 7/2009 | Ando et al. |

FOREIGN PATENT DOCUMENTS

| JP | 2001-154632 | 6/2001 |
| JP | 2004-102076 | 4/2004 |
| JP | 3963884 | 6/2007 |
| WO | WO-2006/075601 A1 | 7/2006 |

\* cited by examiner

*Primary Examiner* — Stephen Sherman
(74) *Attorney, Agent, or Firm* — McDermott Will & Emery LLP

(57) ABSTRACT

The drive device includes a first switch section including switching elements, a second switch section including switching elements, and output circuits. Each of the output circuits includes a switching element having a first and a second end, a first voltage being supplied to the first end, and a first and a second rectifier element each having a current input terminal and a current output terminal connected to the second end of the switching element. Each of the output circuits corresponds to one of the switching elements of the first switch section and one of the switching elements of the second switch section, the one of the switching elements of the first switch section is connected to the current input terminal of the first rectifier element, and the one of the switching elements of the second switch section is connected to the current input terminal of the second rectifier element.

7 Claims, 17 Drawing Sheets

DRIVE DEVICE AND DISPLAY DEVICE

CROSS-REFERENCE TO RELATED APPLICATIONS

This is a continuation of PCT International Application PCT/JP2009/007143 filed on Dec. 22, 2009, which claims priority to Japanese Patent Application No. 2008-326304 filed on Dec. 22, 2008. The disclosures of these applications including the specifications, the drawings, and the claims are hereby incorporated by reference in their entirety.

BACKGROUND

The present disclosure relates to drive devices for driving display panels, such as plasma display panels, liquid crystal display panels, etc.

There are known display panels including a plurality of scan lines and a plurality of signal lines, which intersect each other. Examples of such display panels include flat panel displays (FPDs), such as plasma display panels (PDPs), liquid crystal display (LCD) panels, electroluminescent (EL) panels, etc.

Japanese Patent Publication No. 2001-154632 describes an example signal which is used to drive a scan line. A drive device for driving a display panel needs to generate an output signal for driving each scan line. As an output circuit for generating the output signals, a circuit is commonly used which includes two switching elements connected in series between a power supply and a ground.

However, because the capacitive load of the display panel needs to be instantaneously charged and discharged, and the number of output signals has been increasing with the increase in the number of pixels in the display panel in recent years, the proportion of the circuit area of the switching elements in the drive device has been increasing.

When a plasma display panel etc. is driven, the drive device may change all the output signals simultaneously from a low potential to a high potential. In such a case, a large amount of current flows from a power supply to the capacitive load of the display panel. Therefore, noise may occur in the power supply voltage, or the power supply voltage may temporarily decrease, so that the control of the display panel may be adversely affected.

SUMMARY

The present disclosure describes implementations of a technique of reducing the circuit area of the drive device for driving the display panel, and a technique of reducing the adverse influence on the power supply voltage when the potentials of the output signals are simultaneously changed.

An example drive device of the present disclosure includes a first switch section including a plurality of switching elements each having a first and a second end, a second switch section including a plurality of switching elements each having a first and a second end, and a plurality of output circuits. Each of the plurality of output circuits includes a switching element having a first and a second end, a first voltage being supplied to the first end, a first rectifier element having a current input terminal into which a current flows and a current output terminal from which a current flows out, the current output terminal being connected to the second end of the switching element of the each of the plurality of output circuits, and a second rectifier element having a current input terminal into which a current flows and a current output terminal from which a current flows out, the current output terminal being connected to the second end of the switching element of the each of the plurality of output circuits. A second voltage is supplied to the first end of each of the plurality of switching elements of the first switch section. The second voltage is supplied to the first end of each of the plurality of switching elements of the second switch section. Each of the plurality of output circuits corresponds to one of the plurality of switching elements of the first switch section and one of the plurality of switching elements of the second switch section, the second end of the one of the plurality of switching elements of the first switch section is connected to the current input terminal of the first rectifier element of the each of the plurality of output circuits, and the second end of the one of the plurality of switching elements of the second switch section is connected to the current input terminal of the second rectifier element of the each of the plurality of output circuits.

According to this, a second power supply can be switched by a switching element of the first switch section corresponding to an output circuit, and a switching element of the second switch section corresponding to the output circuit. The output circuit does not need to include a switching element for switching the second power supply, and therefore, the circuit area of the drive device can be reduced.

An example display device according to the present disclosure includes a display panel, and a drive device configured to generate a plurality of output signals for driving the display panel. The drive device includes a first switch section including a plurality of switching elements each having a first and a second end, a second switch section including a plurality of switching elements each having a first and a second end, and a plurality of output circuits. Each of the plurality of output circuits includes a switching element having a first and a second end, a first voltage being supplied to the first end, a first rectifier element having a current input terminal into which a current flows and a current output terminal from which a current flows out, the current output terminal being connected to the second end of the switching element of the each of the plurality of output circuits, and a second rectifier element having a current input terminal into which a current flows and a current output terminal from which a current flows out, the current output terminal being connected to the second end of the switching element of the each of the plurality of output circuits. A second voltage is supplied to the first end of each of the plurality of switching elements of the first switch section. The second voltage is supplied to the first end of each of the plurality of switching elements of the second switch section. Each of the plurality of output circuits corresponds to one of the plurality of switching elements of the first switch section and one of the plurality of switching elements of the second switch section, the second end of the one of the plurality of switching elements of the first switch section is connected to the current input terminal of the first rectifier element of the each of the plurality of output circuits, the second end of the one of the plurality of switching elements of the second switch section is connected to the current input terminal of the second rectifier element of the each of the plurality of output circuits, and one of the plurality of output signals is output from the second end of the switching element of the each of the plurality of output circuits.

According to the examples of the present disclosure, the number of switching elements for generating output signals to drive a display panel can be reduced, whereby the circuit area of the drive device can be reduced. Therefore, the cost of the drive device can be reduced. Also, the adverse influence on the power supply voltage when the potentials of output signals are simultaneously changed can be reduced or prevented.

DETAILED DESCRIPTION

Figure 1:
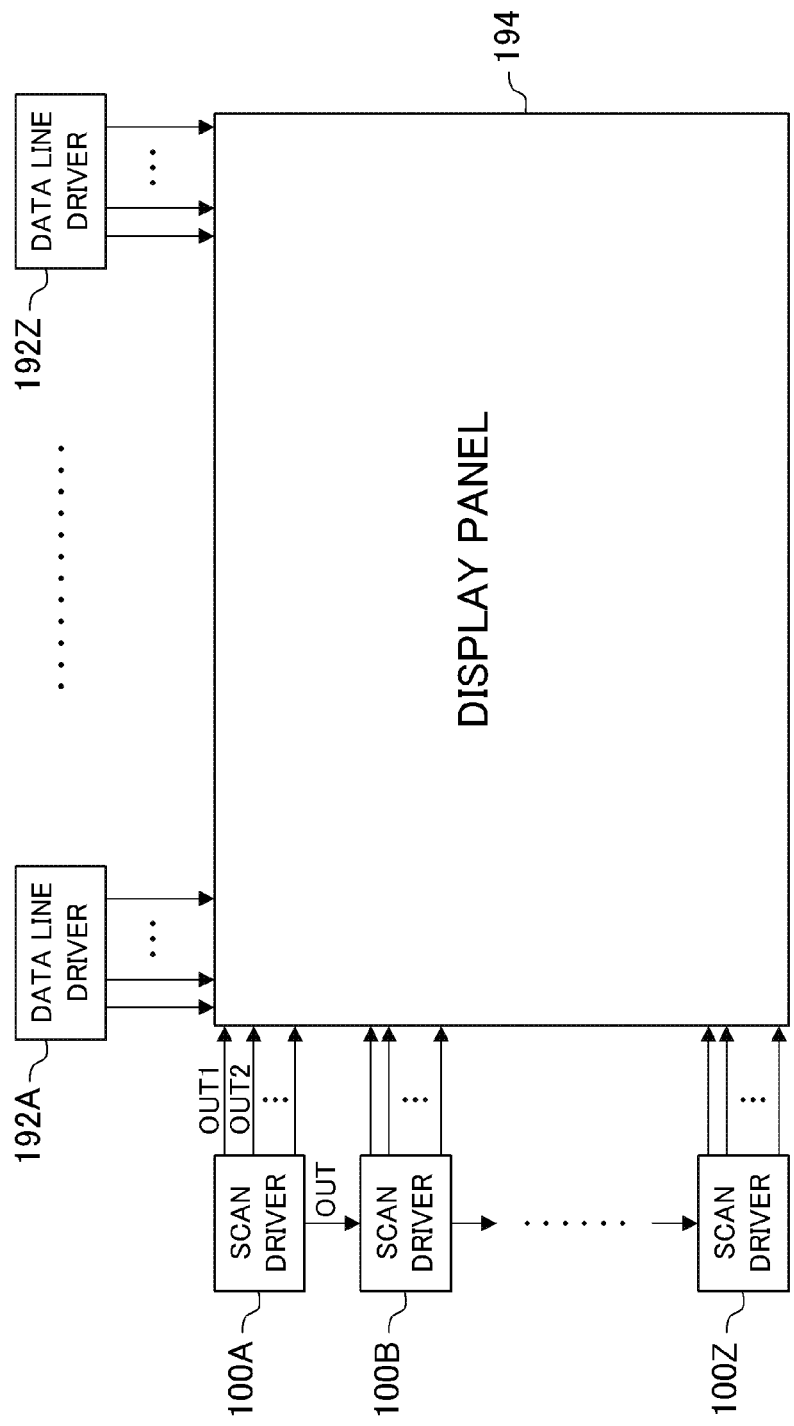
FIG. 1 is a block diagram showing a configuration of a display device according to an embodiment of the present disclosure.

Embodiments of the present disclosure will be described hereinafter with reference to the accompanying drawings. In the drawings, the same or similar parts are identified by the same reference numerals or by reference numerals having the same last two digits. A solid line between functional blocks indicates that the functional blocks are electrically connected. The term "connect" is intended to mean either an indirect or direct connection. Thus, if a first device is connected to a second device, that connection may occur directly, or by way of an indirect electrical connection via other devices and connections.

FIG. 1 is a block diagram showing a configuration of a display device according to an embodiment of the present disclosure. The display device of FIG. 1 includes scan drivers 100A, 100B, . . . , and 100Z each of which serves as a drive device, data line drivers 192A, . . . , and 192Z, and a display panel 194 which is driven by these drivers. The display panel 194 is typically a plasma display panel, but may be other flat panel displays, such as a liquid crystal display panel, an electroluminescent panel, etc.

The scan driver 100A generates output signals OUT1, OUT2, and so on for driving the display panel 194, and drives a plurality of scan lines (often referred to as rows) extending horizontally in FIG. 1 using the output signals OUT1, OUT2, and so on. Each scan line is connected to pixels on a corresponding row (a line of pixels arranged horizontally) of the display panel 194. The data line driver 192A drives a plurality of data lines (often referred to as columns) extending vertically in FIG. 1 based on a plurality of output signals. The scan driver 100A outputs pulses, as the output signals OUT1, OUT2, and so on, sequentially (i.e., one at a time) with a time delay between each pulse, and informs the next scan driver 100B of the output of the final output signal pulse using a signal OUT. The scan driver 100B performs similar operation, and informs the next scan driver of the output of the final output signal pulse. The scan drivers 100A-100Z have substantially the same configuration. The data line drivers 192A-192Z have substantially the same configuration.

Figure 2:
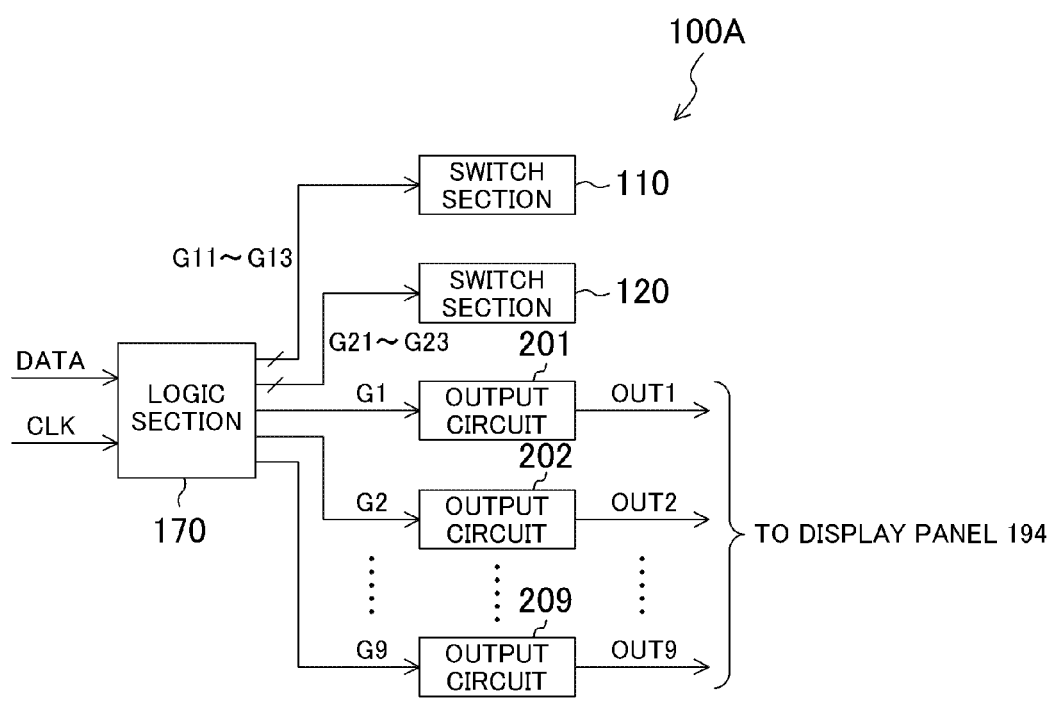
FIG. 2 is a block diagram showing an example configuration of a scan driver of FIG. 1.

FIG. 2 is a block diagram showing an example configuration of the scan driver 100A of FIG. 1. The scan driver 100A includes a logic section 170, switch sections 110 and 120, and output circuits 201, 202, . . . , and 209. The output circuits 201-209 output the output signals OUT1-OUT9, respectively, for driving the scan lines of the display panel 194. Here, an example where the scan driver 100A includes the nine output circuits 201-209 is described, but the scan driver 100A may include a larger number of output circuits.

Figure 3:
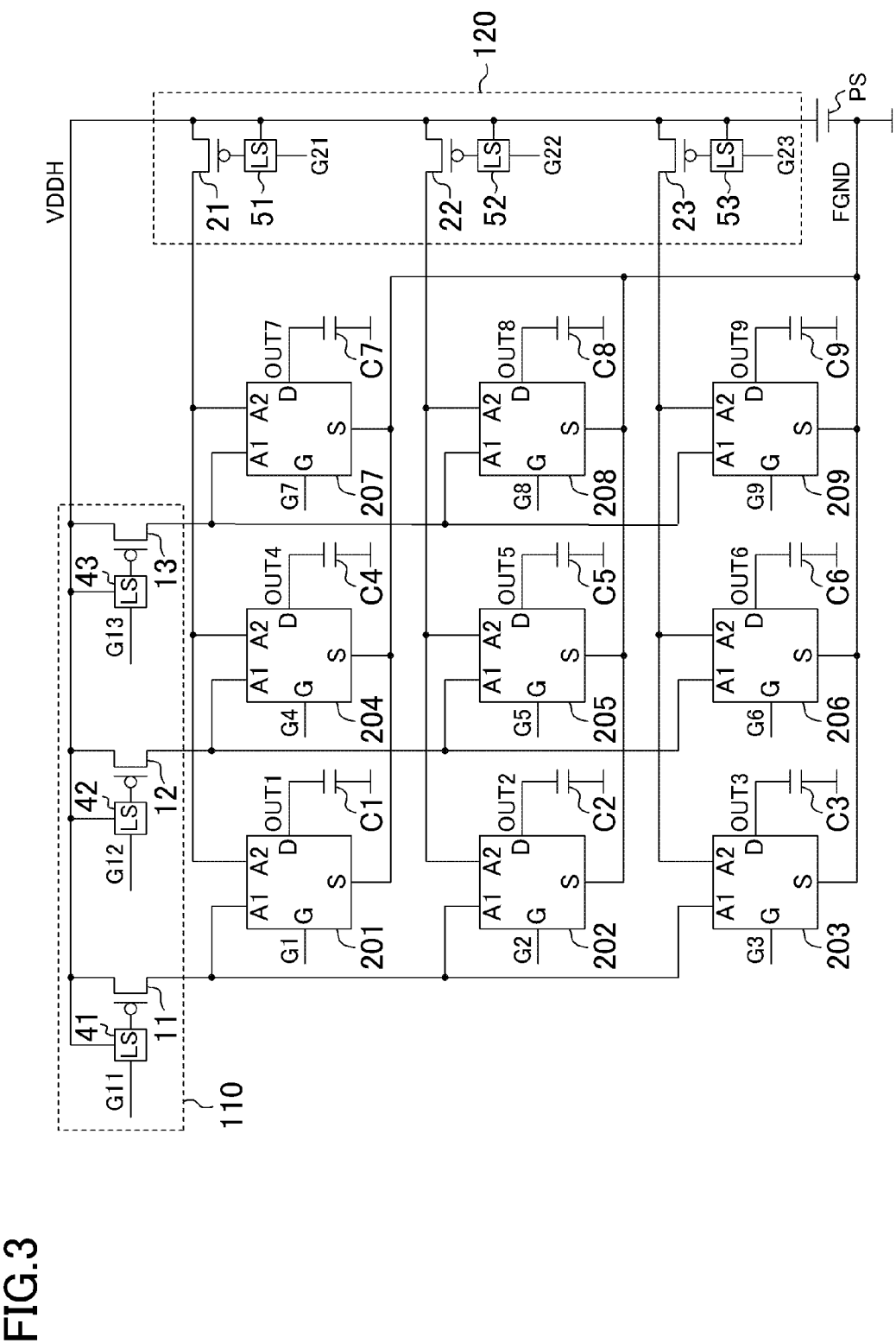
FIG. 3 is a block diagram showing an example configuration of switch sections and output circuits of FIG. 2.

FIG. 3 is a block diagram showing an example configuration of the switch sections 110 and 120 and the output circuits 201, 202, 203, 204, 205, 206, 207, 208, and 209 of FIG. 2. The switch section 110 of FIG. 3 includes p-channel metal oxide semiconductor (PMOS) transistors 11, 12, and 13 which serve as switching elements, and level shift circuits 41, 42, and 43. The switch section 120 includes PMOS transistors 21, 22, and 23 which serve as switching elements, and level shift circuits 51, 52, and 53. The output circuits 201-209 are arranged in a matrix for the sake of convenience in describing FIG. 3, but may be arranged in a line.

A power supply PS is connected to the sources of the PMOS transistors 11-13 and 21-23, which are supplied with a voltage VDDH from the power supply PS. The voltage VDDH is a voltage which needs to be supplied to the display panel 194 to be driven. The voltage VDDH is, for example, 150 V higher than a floating ground voltage FGND when the display panel 194 is a plasma display panel. Each of the level shift circuits 41-43 and 51-53, when receiving an input signal having a high logic level ("H" level), converts the input signal into a signal having a voltage which is substantially equal to the voltage VDDH, and outputs the resultant signal.

Loads C1, C2, C3, C4, C5, C6, C7, C8, and C9 indicate the capacitive loads of the respective corresponding scan lines of the display panel 194. One end of each load C1, C2, C3, C4, C5, C6, C7, C8, and C9 is connected to the output circuit 201, 202, 203, 204, 205, 206, 207, 208, and 209, respectively. The power supply PS is connected to the other end of each load C1-C9, which are supplied with the floating ground voltage FGND from the power supply PS. The ground of logic circuits, such as the logic section 170 etc., is herein used as a voltage reference.

Figure 4:
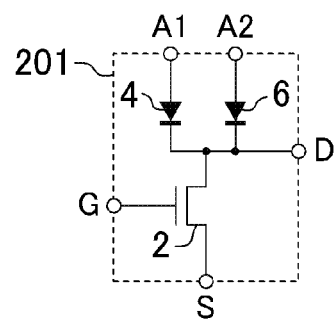
FIG. 4 is a circuit diagram showing an example configuration of the output circuit of FIG. 3.

FIG. 4 is a circuit diagram showing an example configuration of the output circuit 201 of FIG. 3. The output circuit 201 includes an n-channel metal oxide semiconductor (NMOS) transistor 2 which serves as a switching element, and diodes 4 and 6 which serve as rectifier elements. The output circuit 201 does not include a high-side (high-potential) switching element (e.g., a PMOS transistor).

A control signal G1 is input from the logic section 170 of FIG. 2 to the gate G of the NMOS transistor 2. The source S of the NMOS transistor 2 is connected to the power supply which supplies the floating ground voltage FGND. The drain D of the NMOS transistor 2 serves as an output node from which the output signal OUT1 is output. The output node is connected to the cathode terminals of the diodes 4 and 6 from which a current flows out. The anode terminal A1 of the diode 4 into which a current flows is connected to a corresponding one of the PMOS transistors of the switch section 110. The anode terminal A2 of the diode 6 is connected to a corresponding one of the PMOS transistors of the switch section 120. The output circuits 202-209 have a configuration similar to that of the output circuit 201.

It is assumed that the scan driver 100A includes N (N is an integer) output circuits, the switch section 110 of FIG. 3 includes L (L is an integer, where L<N) PMOS transistors, and the switch section 120 includes M (M is an integer, where M<N) PMOS transistors. In this case, every group of M consecutive ones of the output circuits 201-209 is connected to a corresponding one of the PMOS transistors of the switch section 110. The PMOS transistors of the switch section 120 are each connected to a corresponding one of every M consecutive output circuits.

Specifically, the PMOS transistor 11 corresponds to the output circuits 201-203, the PMOS transistor 12 corresponds to the output circuits 204-206, and the PMOS transistor 13 corresponds to the output circuits 207-209. The drains of the PMOS transistors 11-13 are each connected to the terminals A1 of the corresponding output circuits. The PMOS transistor 21 corresponds to the output circuits 201, 204, and 207, the PMOS transistor 22 corresponds to the output circuits 202, 205, and 208, and the PMOS transistor 23 corresponds to the output circuits 203, 206, and 209. The drains of the PMOS transistors 21-23 are each connected to the terminals A2 of the corresponding output circuits. In other words, the output circuits 201-209 each correspond to one of the PMOS transistors 11-13 of the switch section 110 and one of the PMOS transistors 21-23 of the switch section 120.

For example, the scan driver 100A is controlled so that the PMOS transistor 11 of the switch section 110 and the PMOS transistor 21 of the switch section 120 are turned off, and the NMOS transistor 2 of the output circuit 201 corresponding to both the PMOS transistors 11 and 21 is turned on. In this case, the output node of the output circuit 201 is cut off from the supply of the voltage VDDH, and is connected to the power supply which supplies the voltage FGND, so that the voltage FGND is output as the output signal OUT1 to the load C1. When line-sequential scanning is performed, the output circuits 201-209 output similar signals as the output signals OUT1-OUT9 in the order of the output circuits 201, 202, ..., and 209.

It is hereinafter assumed that the high and low potentials of the output signals OUT1-OUT9 are substantially the same as the voltages VDDH and FGND, respectively. The circuit of FIG. 3 has the following states: line-sequential scanning is performed; all the output signals OUT1-OUT9 are at the high potential; all the output signals OUT1-OUT9 are at the low potential; and all the output signals OUT1-OUT9 are in the high impedance state. When line-sequential scanning is performed, only one of the output signals OUT1-OUT9 which is selected in sequence is caused to be at the low potential, and the other output signals are at the high potential.

Figure 5:
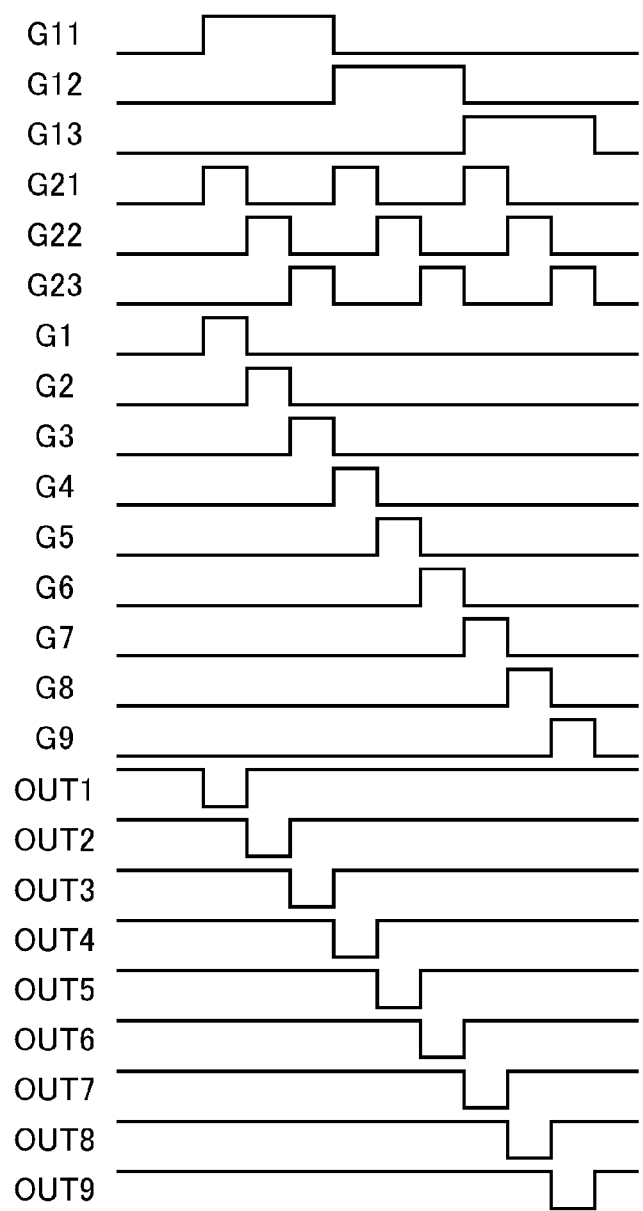
FIG. 5 is a timing chart showing example waveforms of signals in the circuit of FIG. 3.

FIG. 5 is a timing chart showing example waveforms of signals in the circuit of FIG. 3. An example where the circuit of FIG. 3 performs line-sequential scanning will be described. When control signals G11-G13 and G21-G23 are all at a low logic level ("L" level), the output signals OUT1-OUT9 are at the high potential. Initially, the logic section 170 causes the control signals G11 and G21 to go to the "H" level, so that the PMOS transistors 11 and 21 are turned off. Subsequently, the logic section 170 causes the control signal G1 to go to the "H" level, so that the NMOS transistor 2 of the output circuit 201 remains in the on state for a predetermined period of time. As a result, a pulse having a low potential level is output as the output signal OUT1. The width of the pulse is called an address period. The address period is determined, depending on characteristics of a display panel (e.g., a PDP) which is driven by the circuit of FIG. 3.

Next, the logic section 170 causes the control signals G21 and G1 to return to the "L" level, and the control signal G22 to go to the "H" level, so that the PMOS transistor 21 is turned on, and the NMOS transistor 2 of the output circuit 201 and the PMOS transistor 22 are turned off. Subsequently, the logic section 170 causes the control signal G2 to go to the "H" level, so that the NMOS transistor 2 of the output circuit 202 remains in the on state for a predetermined period of time. As a result, a pulse having a low potential level is output as the output signal OUT2. Thereafter, the logic section 170 outputs control signals as shown in FIG. 5. Thus, the output signals OUT1-OUT9 are output as shown in FIG. 5.

Thus, according to the circuit of FIG. 3, one of the output circuits 201-209 can be designated by a combination of the PMOS transistors of the switch section 110 and the PMOS transistors of the switch section 120, and the designated output circuit can be caused to output a pulse as an output signal. By designating one of the output circuits 201-209 in sequence, pulses can be output as the output signals OUT1-OUT9 sequentially (i.e., one at a time).

According to the circuit of FIG. 3, in a drive device including N output circuits, line-sequential scanning can be performed using (M+L) switching elements (PMOS transistors) which are high-side switching elements for switching the voltage VDDH where the condition M×L≧N is satisfied, and (2×N) rectifier elements (diodes). Without this embodiment, N high-side switching elements are required. Specifically, when nine output circuits are provided as shown in FIG. 3, the number of required high-side switching elements is six in this embodiment, but nine without this embodiment.

Although the number of rectifier elements increases, the circuit area of each rectifier element is sufficiently smaller than the circuit area of a switching element. As a practical matter, if a scan driver IC includes about 100 output circuits, the number of switching elements is, for example, 20 (L=M=10), and therefore, the number of switching elements can be reduced by a factor of about 5. Therefore, the circuit area of the scan driver IC can be sufficiently reduced irrespective of the increase in the number of rectifier elements.

A scan driver typically includes output circuits and control circuits which can withstand high voltages, and requires level shift circuits etc. in order to drive high-side switching elements for the output circuits. However, because the number of the switching elements decreases, the number of the level shift circuit can also be reduced by a factor of five in this case.

While a case where the output circuits 201-209 output pulses as the output signals OUT1-OUT9 sequentially (i.e., one at a time) has been described above, the output circuits 201-209 may output pulses in a random sequence. A portion of the output circuits 201-209 may not be operated.

The sizes of the PMOS transistors 11-13 of the switch section 110 may be smaller than the size of any of the PMOS transistors 21-23 of the switch section 120. In this case, the rising and falling slew rates of an output signal is almost determined by the PMOS transistors 21-23 and the NMOS transistor 2 of each output circuit, and the PMOS transistors 11-13 contribute to stabilization of the potential of the output signal.

Note that if interlaced scanning is performed in which every n-th (n is an integer of two or more) scan line is scanned, then when any of the PMOS transistors 21-23 remains in the off state although scan lines to be scanned are changed (e.g., the output circuits 201, 204, and 207 output a pulse in this stated order in FIG. 3), it is not preferable that the sizes of the PMOS transistors 11-13 be reduced.

In the circuit of FIG. 3, the overall drive performance of the PMOS transistors 11-13 and 21-23 is much lower than when each output circuit includes a PMOS transistor. When a plasma display panel etc. is driven, the scan driver 100A may simultaneously change all output signals from the low potential (the voltage FGND etc.) to the high potential (the voltage VDDH). In such a case, according to the circuit of FIG. 3, the ability to charge the capacitive load of the display panel 194 is reduced, so that the slew rate of the output signal is lowered. As a result, adverse influences on the power supply voltage VDDH, i.e., noise occurring in the power supply voltage VDDH and a temporary reduction in the power supply voltage VDDH, can be reduced or prevented.

Figure 6:
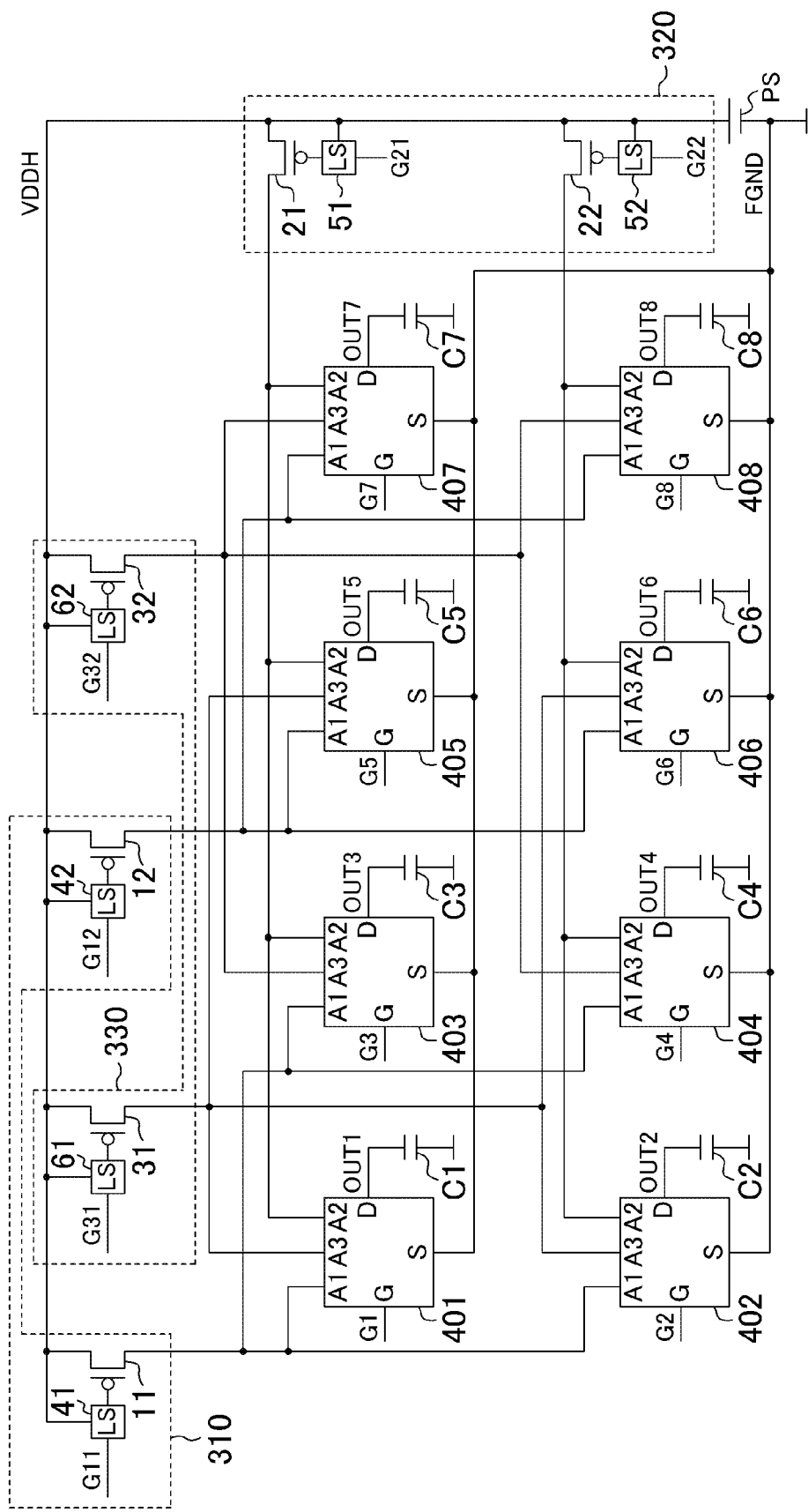
FIG. 6 is a block diagram showing a variation of the circuit of FIG. 3.

FIG. 6 is a block diagram showing a variation of the circuit of FIG. 3. A switch section 310 of FIG. 6 includes PMOS transistors 11 and 12 which serve as switching elements, and level shift circuits 41 and 42. A switch section 320 includes PMOS transistors 21 and 22 which serve as switching elements, and level shift circuits 51 and 52. A switch section 330 includes PMOS transistors 31 and 32 which serve as switching elements, and level shift circuits 61 and 62. Output circuits 401-408 are arranged in a matrix for the sake of convenience in describing FIG. 6, but may be arranged in a line. The output circuits 401-408 of FIG. 6 output output signals OUT1-OUT8, respectively, for driving scan lines of the display panel 194.

The sources of the PMOS transistors 11, 12, 21, 22, 31, and 32 are connected to a power supply which supplies a voltage VDDH. The level shift circuits 61 and 62 are similar to the level shift circuits 41 and 42.

Figure 7:
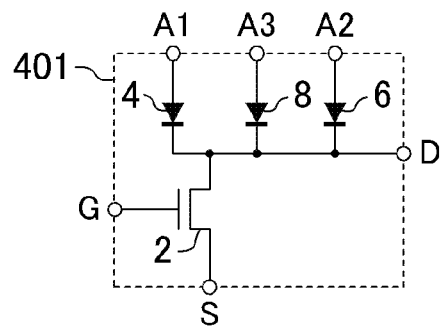
FIG. 7 is a circuit diagram showing an example configuration of an output circuit of FIG. 6.

FIG. 7 is a circuit diagram showing an example configuration of the output circuit 401 of FIG. 6. The output circuit 401 is different from the output circuit 201 of FIG. 4 in that the output circuit 401 further includes a diode 8 which serves as a rectifier element. The cathode of the diode 8 is connected to an output node of the output circuit 401 from which the output signal OUT1 is output. The anode terminal A1 of the diode 4 is connected to a corresponding one of the PMOS transistors of the switch section 310, the anode terminal A2 of the diode 6 is connected to a corresponding one of the PMOS transistors of the switch section 320, and the anode terminal A3 of the diode 8 is connected to a corresponding one of the PMOS transistors of the switch section 330. The output circuits 402-408 have a configuration similar to that of the output circuit 401.

It is assumed that a scan driver having the circuit of FIG. 6 includes N output circuits, the switch section 310 of FIG. 6 includes L (L is an integer, where L<N) PMOS transistors, the switch section 320 includes M (M is an integer, where M<N) PMOS transistors, and the switch section 330 includes K (K is an integer, where K<N) PMOS transistors. In this case, every group of M×K consecutive ones of the output circuits 401-408 is connected to a corresponding one of the PMOS transistors of the switch section 310. The PMOS transistors of the switch section 320 are each connected to a corresponding one of every M consecutive output circuits. Every other group of M consecutive output circuits is connected to a corresponding one of the PMOS transistors of the switch section 330.

Specifically, the PMOS transistor 11 corresponds to the output circuits 401-404, and the PMOS transistor 12 corresponds to the output circuits 405-408. The drains of the PMOS transistors 11 and 12 are each connected to the terminals A1 of the corresponding output circuits. The PMOS transistor 21 corresponds to the output circuits 401, 403, 405, and 407, and the PMOS transistor 22 corresponds to the output circuits 402, 404, 406, and 408. The drains of the PMOS transistors 21 and 22 are each connected to the terminals A2 of the corresponding output circuits.

The PMOS transistors 31 corresponds to the output circuits 401, 402, 405, and 406, and the PMOS transistor 32 corresponds to the output circuits 403, 404, 407, and 408. The drains of the PMOS transistors 31 and 32 are each connected to the terminals A3 of the corresponding output circuits. In other words, the output circuits 401-408 each correspond to one of the PMOS transistors 11 and 12 of the switch section 310, one of the PMOS transistors 21 and 22 of the switch section 320, and one of the PMOS transistors 31 and 32 of the switch section 330.

For example, the circuit of FIG. 6 is controlled so that the PMOS transistor 11 of the switch section 310, the PMOS transistor 21 of the switch section 320, and the PMOS transistor 31 of the switch section 330 are turned off, and the NMOS transistor 2 of the output circuit 401 corresponding to all of the PMOS transistors 11, 21, and 31 is turned on. In this case, the output node of the output circuit 401 is cut off from the supply of the voltage VDDH, and is connected to a power supply which supplies a voltage FGND, so that the voltage FGND is output as the output signal OUT1 to the load C1. When line-sequential scanning is performed, the output circuits 401-408 output similar signals as the output signals OUT1-OUT8 in the order of the output circuits 401, 402, . . . , and 408.

Figure 8:
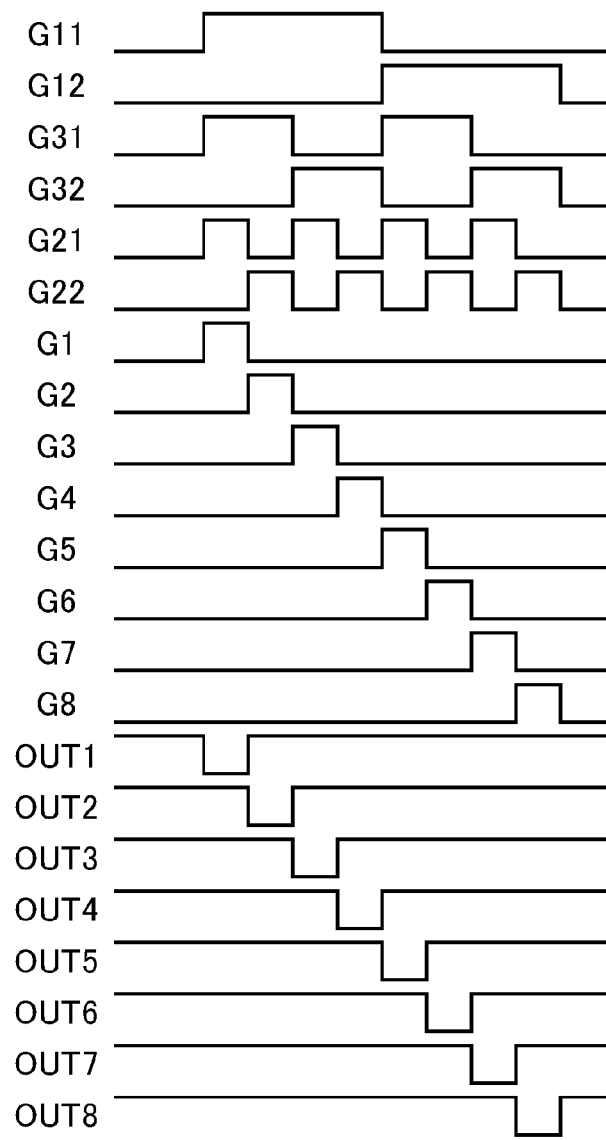
FIG. 8 is a timing chart showing example waveforms of signals in the circuit of FIG. 6.

FIG. 8 is a timing chart showing example waveforms of signals in the circuit of FIG. 6. An example where the circuit of FIG. 6 performs line-sequential scanning will be described. When all control signals G11-G32 are at the "L" level, the output signals OUT1-OUT8 are at the high potential (substantially equal to the voltage VDDH). Initially, the logic section 170 causes the control signals G11, G21, and G31 to go to the "H" level, so that the PMOS transistors 11, 21, and 31 are turned off. Subsequently, the logic section 170 causes the control signal G1 to go to the "H" level, so that the NMOS transistor 2 of the output circuit 401 remains in the on state for a predetermined period of time. As a result, a pulse having a low potential level is output as the output signal OUT1.

Next, the logic section 170 causes the control signals G21 and G1 to return to the "L" level, and the control signal G22 to go to the "H" level, so that the PMOS transistor 21 is turned on, and the NMOS transistor 2 of the output circuit 401 and the PMOS transistor 22 are turned off. Subsequently, the logic section 170 causes the control signal G2 to go to the "H" level, so that the NMOS transistor 2 of the output circuit 402 remains in the on state for a predetermined period of time. As a result, a pulse having a low potential level is output as the output signal OUT2. Thereafter, the logic section 170 outputs signals as shown in FIG. 8. Thus, the output signals OUT1-OUT8 are output as shown in FIG. 8.

According to the circuit of FIG. 6, in a drive device having N output circuits, line-sequential scanning can be performed using (M+L+K) switching elements (PMOS transistors) which serve as high-side switching elements where the condition M×L×K≧N is satisfied, and (3×N) rectifier elements (diodes). Without this embodiment, N high-side switching elements are required. Specifically, when eight output circuits are provided as shown in FIG. 6, the number of required high-side switching elements is six in this embodiment, but eight without this embodiment.

As a practical matter, if a scan driver IC includes about 100 output circuits, the number of switching elements is, for example, 14 (L=M=5 and K=4), and therefore, the number of switching elements can be reduced by a factor of about 7. Therefore, the circuit area of the scan driver IC can be sufficiently reduced irrespective of the increase in the number of rectifier elements. The number of level shift circuits for the output circuits can also be reduced by a factor of seven.

According to the circuit of FIG. 6, the switch section 330 including a group of switching elements is further provided, whereby the number of switching elements can be further reduced compared to the circuit of FIG. 3. Note that because the number of rectifier elements increases, optimization needs to be performed, taking a trade-off into account.

While a case where the output circuits 401-408 output pulses as the output signals OUT1-OUT8 sequentially (i.e., one at a time) has been described above, the output circuits 401-408 may output pulses in a random sequence. A portion of the output circuits 401-408 may not be operated.

As is similar to the PMOS transistors 11-13 of the switch section 110 of FIG. 3, the sizes of the PMOS transistors 31 and 32 of the switch section 330 of FIG. 6 may be smaller than the size of any of the PMOS transistors 21 and 22 of the switch section 320.

Four or more switch sections including a plurality of PMOS transistors may be provided. One output circuit may be designated by a combination of PMOS transistors, one selected from each switch section.

Figure 9:
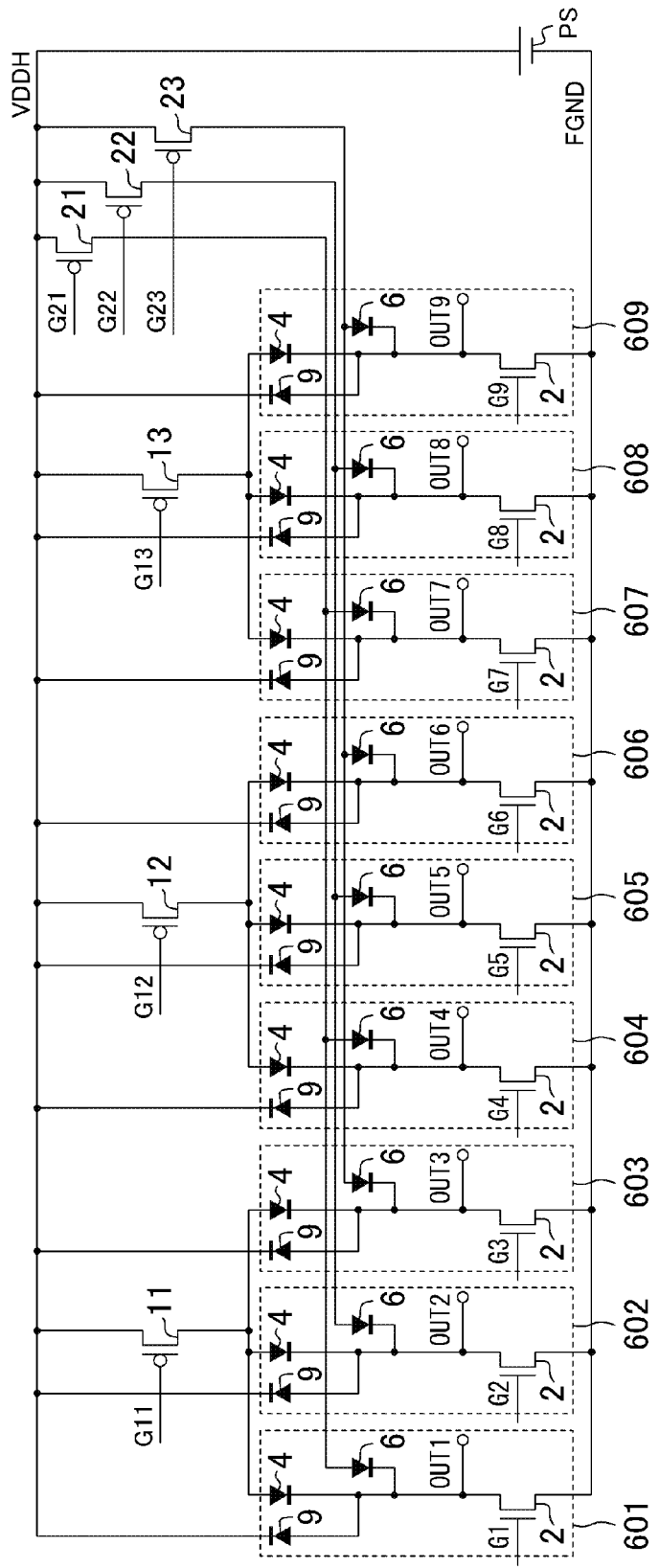
FIG. 9 is a block diagram showing a configuration of another variation of the circuit of FIG. 3.

FIG. 9 is a block diagram showing a configuration of another variation of the circuit of FIG. 3. The circuit of FIG. 9 is similar to the circuit of FIG. 3, except that the circuit of FIG. 9 includes output circuits 601-609 instead of the output circuits 201-209. In FIG. 9, level shift circuits are not shown. The output circuit 601 of FIG. 9 is similar to the output circuit 201 of FIG. 4, except that the output circuit 601 further includes a flyback diode 9. The anode of the flyback diode 9 is connected to an output node from which an output signal OUT1 is output, while the cathode of the flyback diode 9 is connected to a power supply which supplies a voltage VDDH. The output circuits 602-609 have a configuration similar to that of the output circuit 601.

The loads of the scan lines of the display panel 194 are also connected to a sustain driver. The sustain driver is capacitively coupled to the output circuit 601 etc. Therefore, the output voltage of the sustain driver which changes in a step-wise manner is superimposed on the output signal OUT1 etc. of the output circuit 601 etc., so that the voltage of the output node may be excessively high. In this case, the flyback diode 9 causes a current to flow from the output node to the power supply, whereby the voltage of the output node can be prevented from being excessively high.

In the circuit of FIG. 3 etc., an example case has been described where, when line-sequential scanning is performed, only one of the output signals OUT1-OUT9 which is selected in sequence is at the low potential, and the other output signals are at the high potential. In some images output to the display panel 194, simultaneous drive may be performed in which groups of some consecutive ones of the output signals OUT1-OUT9 are sequentially caused to be simultaneously at the low potential while the other output signals are caused to be at the high potential. For example, simultaneous drive may be performed when adjacent scan lines have the same data, or when adjacent scan lines have almost the same data, and data replacement is performed so that the adjacent scan lines have exactly the same data. By performing simultaneous drive in combination with line-sequential scanning, or repeatedly performing only simultaneous drive, the time required for scanning operation can be reduced. As a result, for example, when the display panel 194 is a plasma display panel, the sustain period can be increased, whereby the luminance and contrast can be enhanced.

Figure 10:
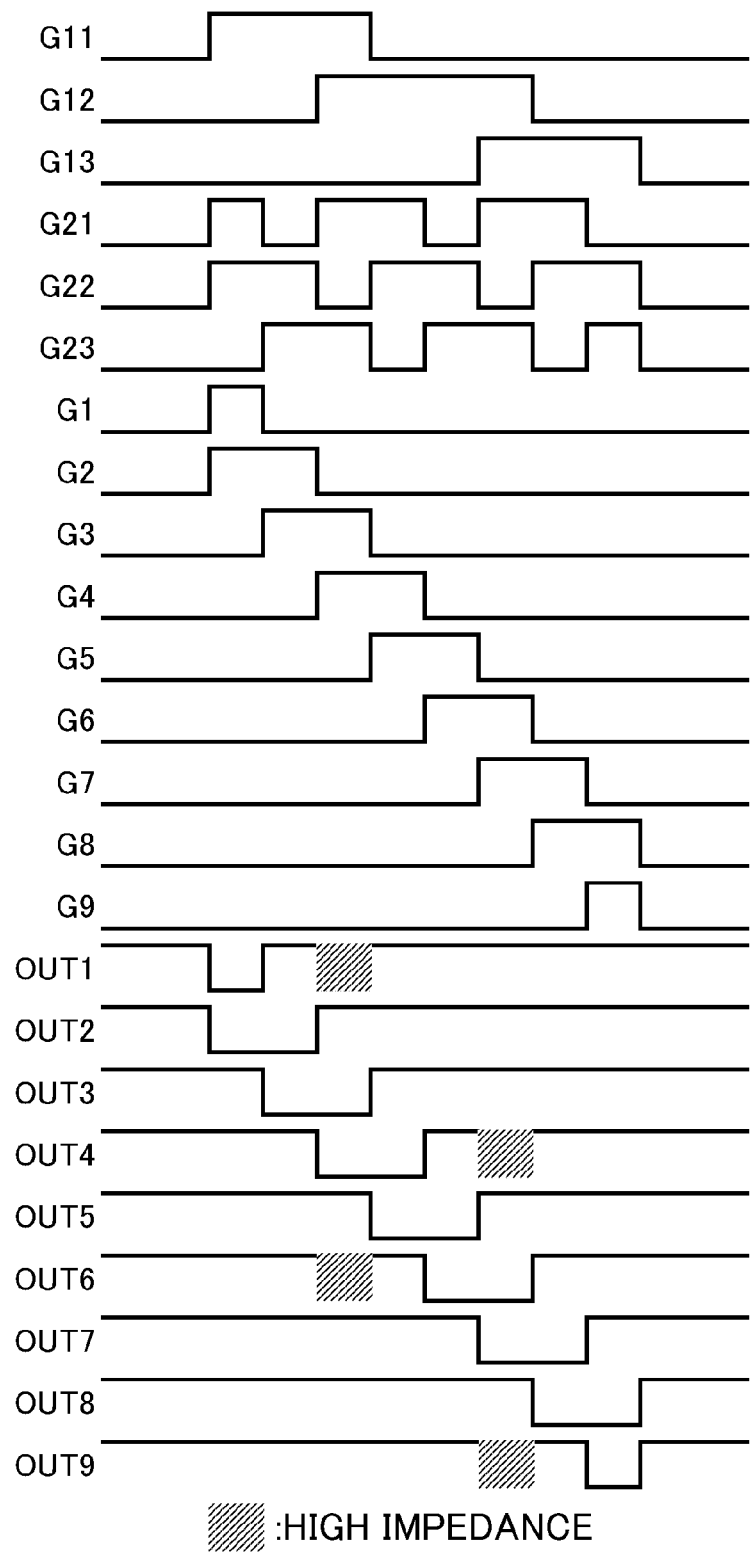
FIG. 10 is a timing chart showing example signal waveforms in the circuit of FIG. 3 when simultaneous drive is performed.

In the circuit of FIG. 3 etc., simultaneous drive may be performed, i.e., a plurality of consecutive output signals may be simultaneously driven to the low potential. FIG. 10 is a timing chart showing example signal waveforms in the circuit of FIG. 3 when simultaneous drive is performed. The logic section 170 outputs control signals G11-G13, G21-G23, and G1-G9 as shown in FIG. 10. In this case, one or two of the PMOS transistors 11-13 included in the switch section 110, and two or more of the PMOS transistors 21-23 included in the switch section 120, are turned off. The NMOS transistors 2 of some output circuits each corresponding to any of the PMOS transistors of the switch section 110 that is turned off and any of the PMOS transistors of the switch section 120 that is turned off, are turned on. As a result, as shown in FIG. 10, overlapping groups of two consecutive output signals are sequentially caused to be at the low potential, e.g., the output signal OUT1 and OUT2 are caused to be at the low potential, and next, the output signals OUT2 and OUT3 are caused to be at the low potential.

When two or more of the PMOS transistors of the switch section 110 are turned off, a portion of the output signals which is not caused to be at the low potential (in FIG. 10, the output signals OUT1 and OUT6 when the output signals OUT3 and OUT4 are at the low potential, and the output signals OUT4 and OUT9 when the output signals OUT6 and OUT7 are at the low potential) is caused to be in the high impedance state. This is because the high side and low side (low potential) of output circuits corresponding to those output signals are not connected to the power supply PS. Because the load driven by the output signals OUT1-OUT9 is capacitive, the load holds the immediately previous high potential for a short period of time. Note that the potential of the load is affected by the surrounding circuits and therefore is not very stable, so that the load (plasma display panel) may be erroneously discharged.

Figure 11:
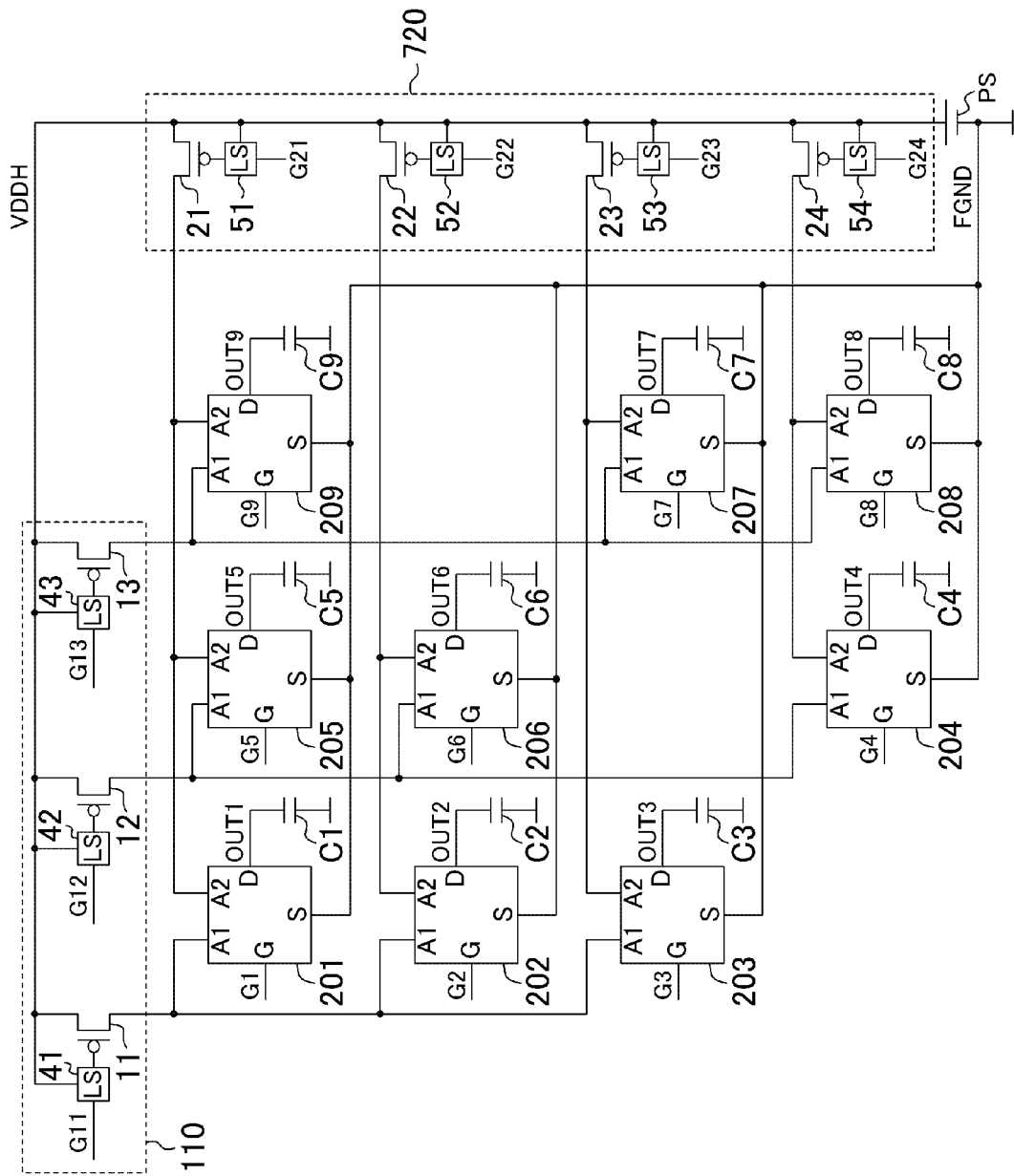
FIG. 11 is a block diagram showing a configuration of still another variation of the circuit of FIG. 3.

FIG. 11 is a block diagram showing a configuration of still another variation of the circuit of FIG. 3. The circuit of FIG. 11 has a configuration similar to that of the circuit of FIG. 3, except that the circuit of FIG. 11 includes a switch section 720 instead of the switch section 120, and the output circuits 204-209 are arranged in a different manner. The switch section 720 includes PMOS transistors 21, 22, 23, and 24 which serve as switching elements, and level shift circuits 51, 52, 53, and 54. The output circuits 201-209 are arranged in a matrix for the sake of convenience in describing FIG. 11, but may be arranged in a line.

The circuit of FIG. 11 is controlled so that if overlapping groups of two consecutive output signals are sequentially caused to be at the low potential, then when some PMOS transistors of the switch section 110 are turned off, only one output circuit is connected to any of the PMOS transistors of the switch section 110 which are turned off and one of the PMOS transistors of the switch section 720 which is turned off. In other words, there is no output circuit which is not connected to the high-side power supply, except for the two designated output circuits, i.e., there is no output signal in the high impedance state.

It is assumed that the scan driver 100A includes N (N is an integer) output circuits, the switch section 110 of FIG. 11 includes L (L is an integer, where L<N) PMOS transistors, and the switch section 720 includes M (M is an integer, where M<N) PMOS transistors. In this case, every group of M−1 consecutive ones of the output circuits 201-209 is connected to a corresponding one of the PMOS transistors of the switch section 110. The PMOS transistors of the switch section 720 are each connected to a corresponding one of every M consecutive output circuits.

Specifically, the PMOS transistor 11 corresponds to the output circuits 201-203, the PMOS transistor 12 corresponds to the output circuits 204-206, and the PMOS transistor 13 corresponds to the output circuits 207-209. The drains of the PMOS transistors 11-13 are each connected to the terminals A1 of the corresponding output circuits. The PMOS transistor 21 corresponds to the output circuits 201, 205, and 209, the PMOS transistor 22 corresponds to the output circuits 202 and 206, the PMOS transistor 23 corresponds to the output circuits 203 and 207, and the PMOS transistor 24 corresponds to the output circuits 204 and 208. The drains of the PMOS transistors 21-24 are each connected to the terminals A2 of the corresponding output circuits. In other words, the output circuits 201-209 each correspond to one of the PMOS transistors 11-13 of the switch section 110 and one of the PMOS transistors 21-24 of the switch section 720.

Figure 12:
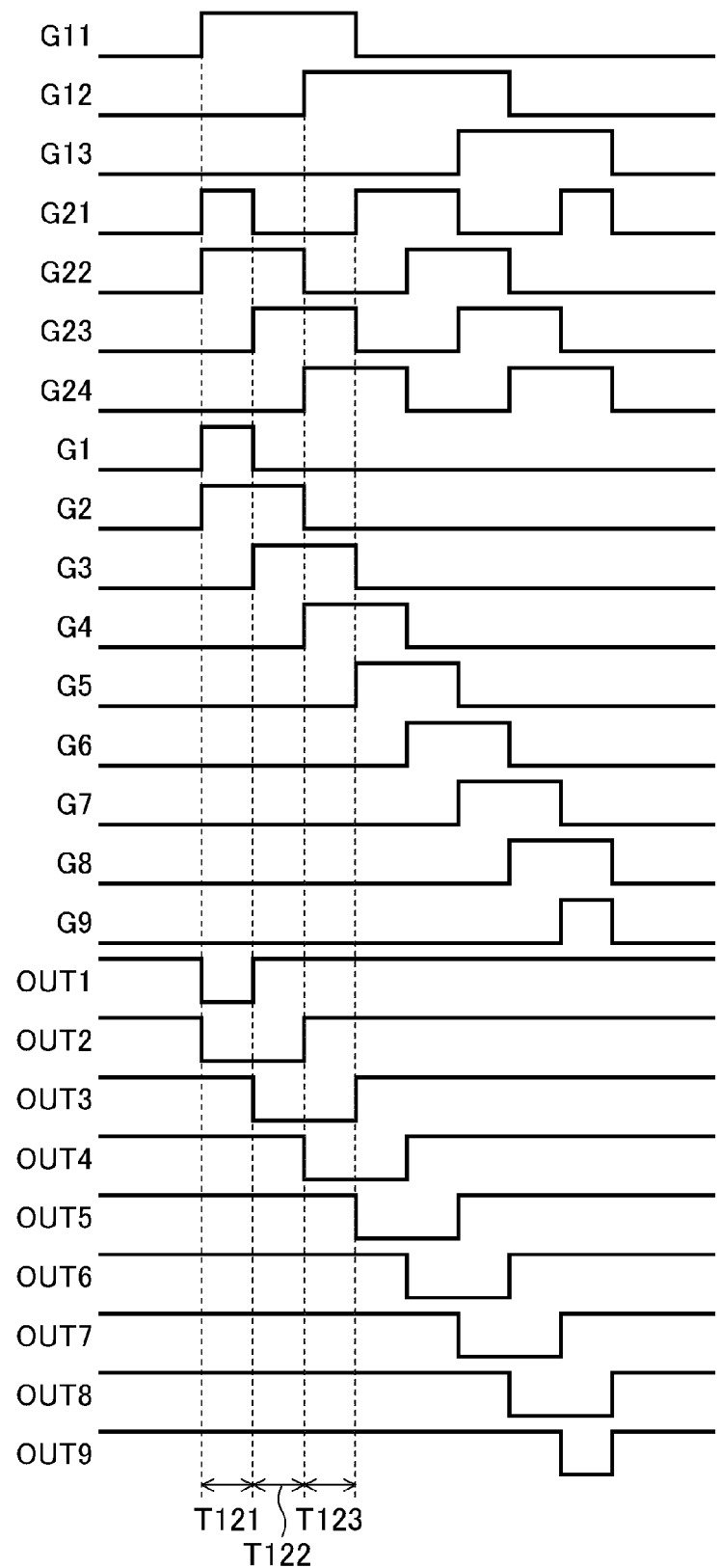
FIG. 12 is a timing chart showing example signal waveforms in the circuit of FIG. 11.

FIG. 12 is a timing chart showing example signal waveforms in the circuit of FIG. 11. An example where the circuit of FIG. 11 is operated so that overlapping groups of two consecutive output signals are sequentially caused to be at the low potential, will be described. The logic section 170 outputs control signals G11-G13, G21-G24, and G1-G9 as shown in FIG. 12.

When the control signals G11-G13 and G21-G24 are all at the "L" level, the output signals OUT1-OUT9 are at the high potential. During periods T121 and T122 of FIG. 12, only one of the PMOS transistors 11-13 of the switch section 110 is turned off, and only two of the PMOS transistors 21-24 of the switch section 720 are turned off.

During the period T121, the logic section 170 causes the control signals G11, G21, and G22 to go to the "H" level, so that the PMOS transistors 11, 21, and 22 corresponding to these control signals are turned off. Subsequently, the logic section 170 causes the control signals G1 and G2 to go to the "H" level. As a result, the NMOS transistors of the output circuits 201 and 202 are turned on, so that the output signals OUT1 and OUT2 are caused to be at the low potential. The output signals OUT3-OUT9 are caused to be at the high potential.

Next, during the period T122, the logic section 170 causes the control signals G11, G22, G23, G2, and G3 to go to the "H" level. As a result, the output signal OUT1 is caused to be at the high potential, and the output signal OUT3 is caused to be at the low potential. The output signal OUT2 remains at the low potential, and the output signals OUT4-OUT9 remain at the high potential.

During a period T123 of FIG. 12, only two of the PMOS transistors 11-13 of the switch section 110 are turned off, and only two of the PMOS transistors 21-24 of the switch section 720 are turned off. During the period T123, the logic section 170 causes the control signals G11, G12, G23, and G24 to go to the "H" level, so that the PMOS transistors 11, 12, 23, and 24 corresponding to these control signals are turned off. Subsequently, the logic section 170 causes the control signals G3 and G4 to go to the "H" level. As a result, the NMOS transistors of the output circuits 203 and 204 are turned on, so that the output signal OUT2 is caused to be at the high potential, and the output signal OUT4 is caused to be at the low potential. The output signal OUT3 remains at the low potential, and the output signals OUT1 and OUT5-OUT9 remain at the high potential.

Thereafter, the logic section 170 outputs the control signals G1'-G13, G21-G24, and G1-G9 as shown in FIG. 12. The output circuits 201-209 output the output signals OUT1-OUT9 as shown in FIG. 12.

According to the circuit of FIG. 11, overlapping groups of two consecutive output signals can be sequentially designated by a combination of one or two of the PMOS transistors of the switch section 110 and two of the PMOS transistors of the switch section 720, and the designated output signals can be caused to be at the low potential. Therefore, the time required for scanning operation can be reduced.

Figure 13:
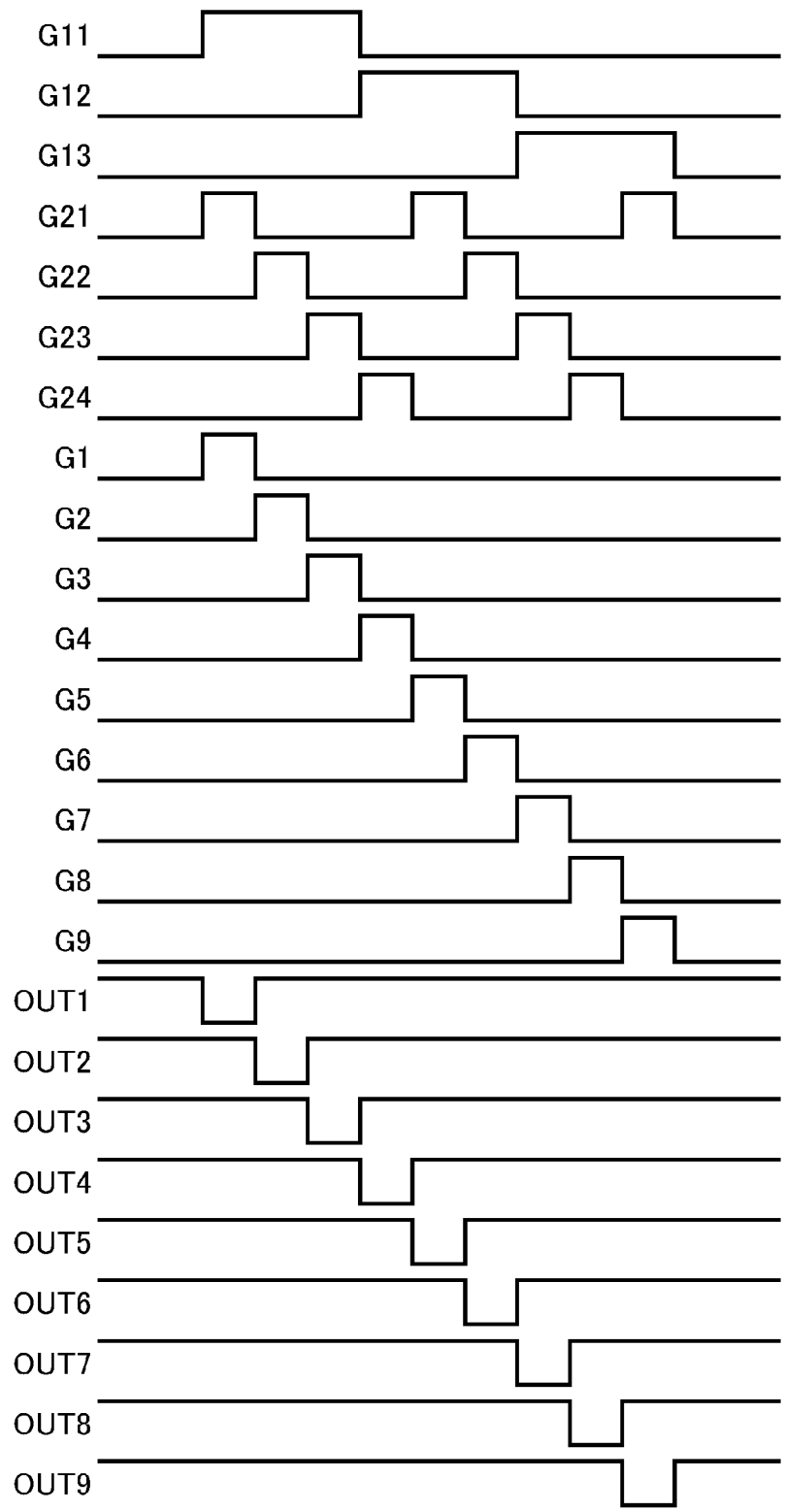
FIG. 13 is a timing chart showing example signal waveforms in the circuit of FIG. 11 when line-sequential scanning is performed.

FIG. 13 is a timing chart showing example signal waveforms in the circuit of FIG. 11 when line-sequential scanning is performed. The logic section 170 outputs control signals G11-G13, G21-G24, and G1-G9 as shown in FIG. 13, whereby the circuit of FIG. 11 can easily perform line-sequential scanning in which the output signals OUT1-OUT9 are caused to be at the low potential sequentially (i.e., one at a time) as with the circuit of FIG. 3.

Figure 14:
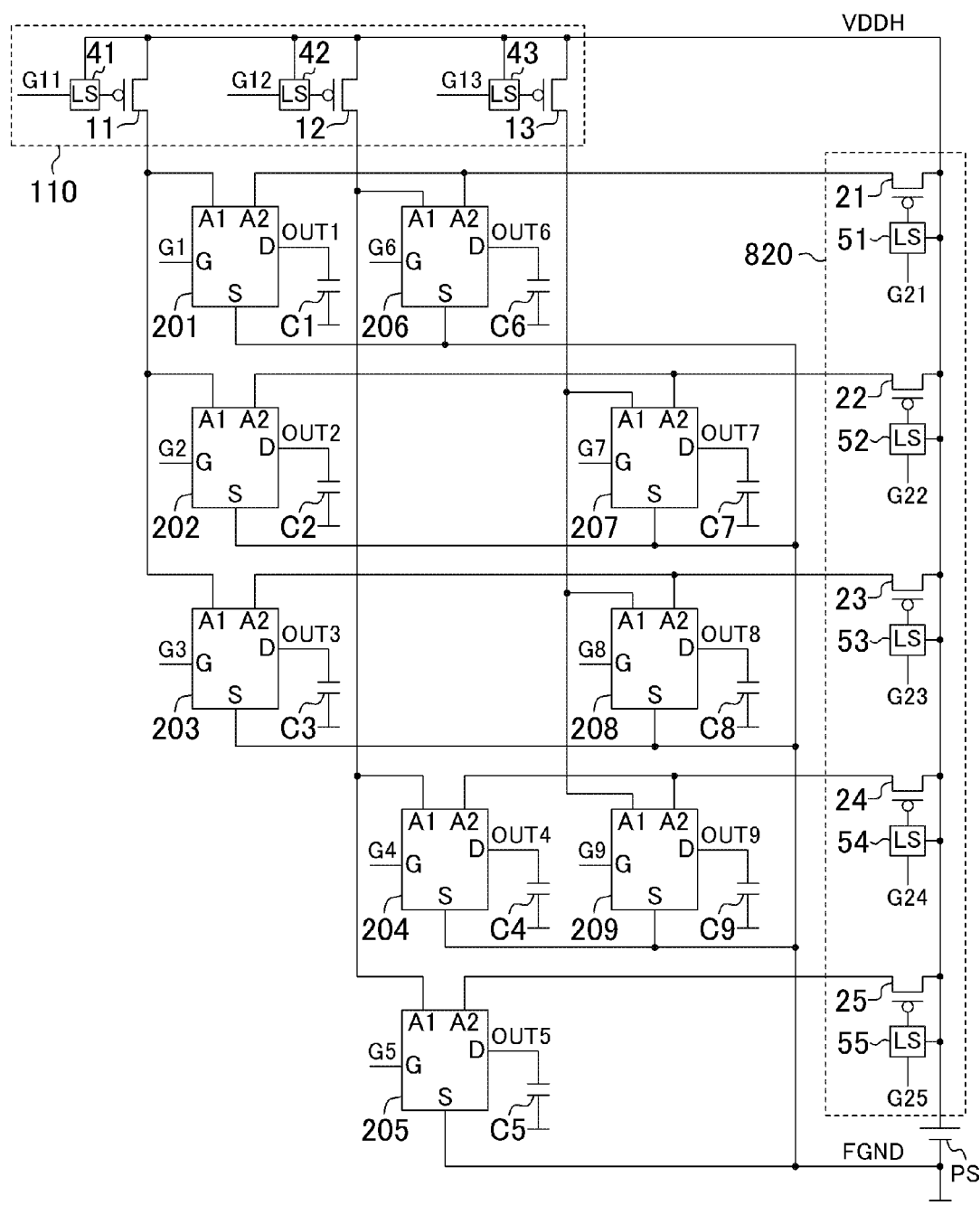
FIG. 14 is a block diagram showing still another variation of the circuit of FIG. 3.

FIG. 14 is a block diagram showing still another variation of the circuit of FIG. 3. The circuit of FIG. 14 has a configuration similar to the circuit of FIG. 3, except that the circuit of FIG. 14 includes a switch section 820 instead of the switch section 120, and the output circuits 204-209 are arranged in a different manner. The switch section 820 includes PMOS transistors 21, 22, 23, 24, and 25 which serve as switching elements, and level shift circuits 51, 52, 53, 54, and 55. The output circuits 201-209 are arranged in a matrix for the sake of convenience in describing FIG. 14, but may be arranged in a line.

The circuit of FIG. 14 is controlled so that if overlapping groups of three consecutive output signals are sequentially caused to be at the low potential, then when some PMOS transistors of the switch section 110 are turned off, only one output circuit is connected to any of the PMOS transistors of the switch section 110 which are turned off and to one of the PMOS transistors of the switch section 820 which is turned off. In other words, there is no output circuit which is not connected to the high-side power supply, except for the three designated output circuits, i.e., there is no output signal in the high impedance state.

It is assumed that the scan driver 100A includes N (N is an integer) output circuits, the switch section 110 of FIG. 14 includes L (L is an integer, where L<N) PMOS transistors, and the switch section 820 includes M (M is an integer, where M<N) PMOS transistors. In this case, every group of M−2 consecutive ones of the output circuits 201-209 is connected to a corresponding one of the PMOS transistors of the switch section 110. The PMOS transistors of the switch section 820 are each connected to a corresponding one of every M consecutive output circuits.

Specifically, the PMOS transistor 11 corresponds to the output circuits 201-203, the PMOS transistor 12 corresponds to the output circuits 204-206, and the PMOS transistor 13 corresponds to the output circuits 207-209. The drains of the PMOS transistors 11-13 are each connected to the terminals A1 of the corresponding output circuits. The PMOS transistor 21 corresponds to the output circuits 201 and 206, the PMOS transistor 22 corresponds to the output circuits 202 and 207, the PMOS transistor 23 corresponds to the output circuits 203 and 208, the PMOS transistor 24 corresponds to the output circuits 204 and 209, and the PMOS transistor 25 corresponds to the output circuit 205. The drains of the PMOS transistors 21-25 are each connected to the terminals A2 of the corresponding output circuits. In other words, the output circuits 201-209 are each connected to one of the PMOS transistors 11-13 of the switch section 110 and one of the PMOS transistors 21-25 of the switch section 820.

Figure 15:
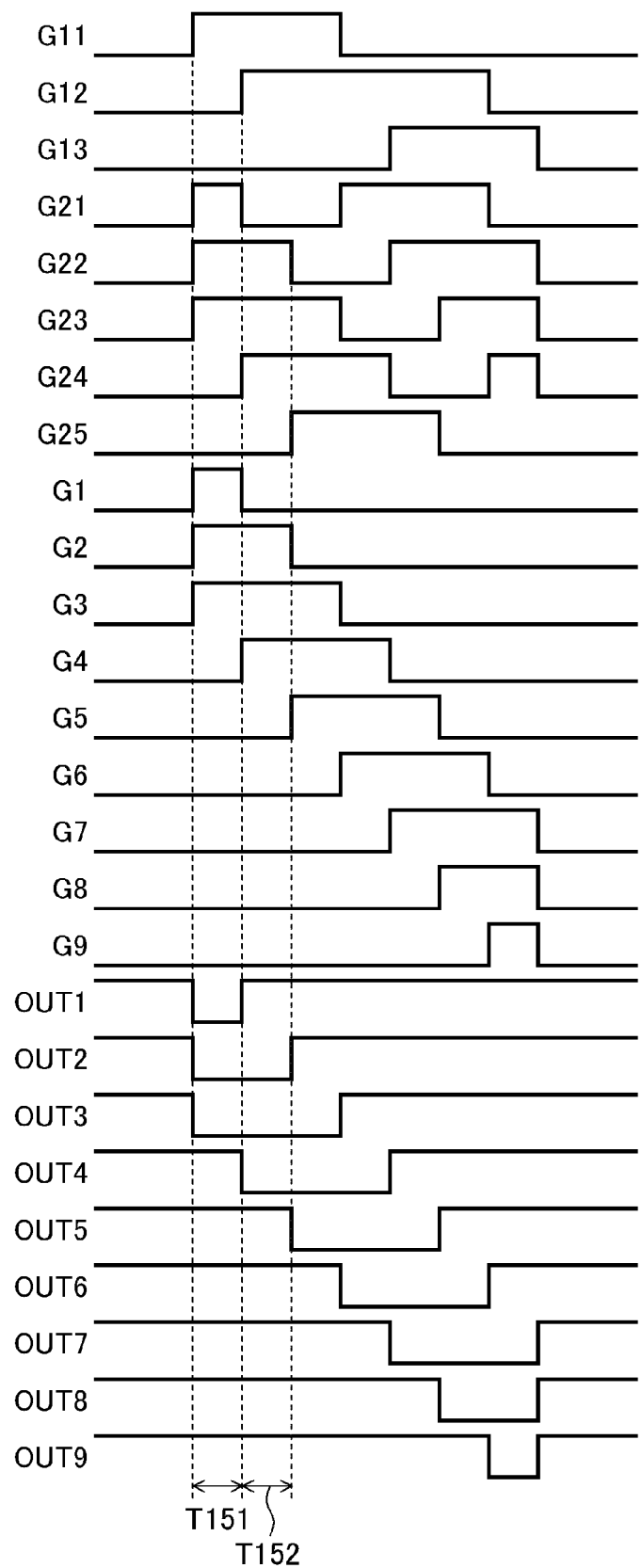
FIG. 15 is a timing chart showing example signal waveforms of the circuit of FIG. 14.

FIG. 15 is a timing chart showing example signal waveforms of the circuit of FIG. 14. An example where the circuit of FIG. 14 is operated so that overlapping groups of three consecutive output signals are sequentially caused to be at the low potential, will be described. The logic section 170 outputs control signals G11-G13, G21-G25, and G1-G9 as shown in FIG. 15.

When the control signals G11-G13 and G21-G25 are all at the "L" level, the output signals OUT1-OUT9 are at the high potential. During periods T151 and T152 of FIG. 15, only one of the PMOS transistors 11-13 of the switch section 110 is turned off, and only three of the PMOS transistors 21-25 of the switch section 820 are turned off.

During the period T151, the logic section 170 causes the control signals G11 and G21-G23 to go to the "H" level, so that the PMOS transistors 11 and 21-23 corresponding to these control signals are turned off. Subsequently, the logic section 170 causes the control signals G1-G3 to go to the "H" level. As a result, the NMOS transistors of the output circuits 201-203 are turned on, so that the output signals OUT1-OUT3 are caused to be at the low potential. The output signals OUT4-OUT9 are caused to be at the high potential.

During the period T152 of FIG. 15, only two of the PMOS transistors 11-13 of the switch section 110 are turned off, and only three of the PMOS transistors 21-25 of the switch section 820 are turned off. During the period T152, the logic section 170 causes the control signals G11, G12, and G22-G24 to go to the "H" level, so that the PMOS transistors 11, 12, and 22-24 corresponding to these control signals are turned off. Subsequently, the logic section 170 causes the control signals G2-G4 to go to the "H" level. As a result, the NMOS transistors of the output circuits 202-204 are turned on, so that the output signal OUT1 is caused to be at the high potential, and the output signal OUT4 is caused to be at the low potential. The output signals OUT2 and OUT3 remains at the low potential, and the output signals OUT5-OUT9 remain at the high potential.

Thereafter, the logic section 170 outputs the control signals G11-G13, G21-G25, and G1-G9 as shown in FIG. 15. The output circuits 201-209 output the output signals OUT1-OUT9 as shown in FIG. 15.

According to the circuit of FIG. 14, overlapping groups of three consecutive output signals can be successively designated by a combination of one or two of the PMOS transistors of the switch section 110 and three of the PMOS transistors of the switch section 820, and the designated output signals can be caused to be at the low potential.

Figure 16:
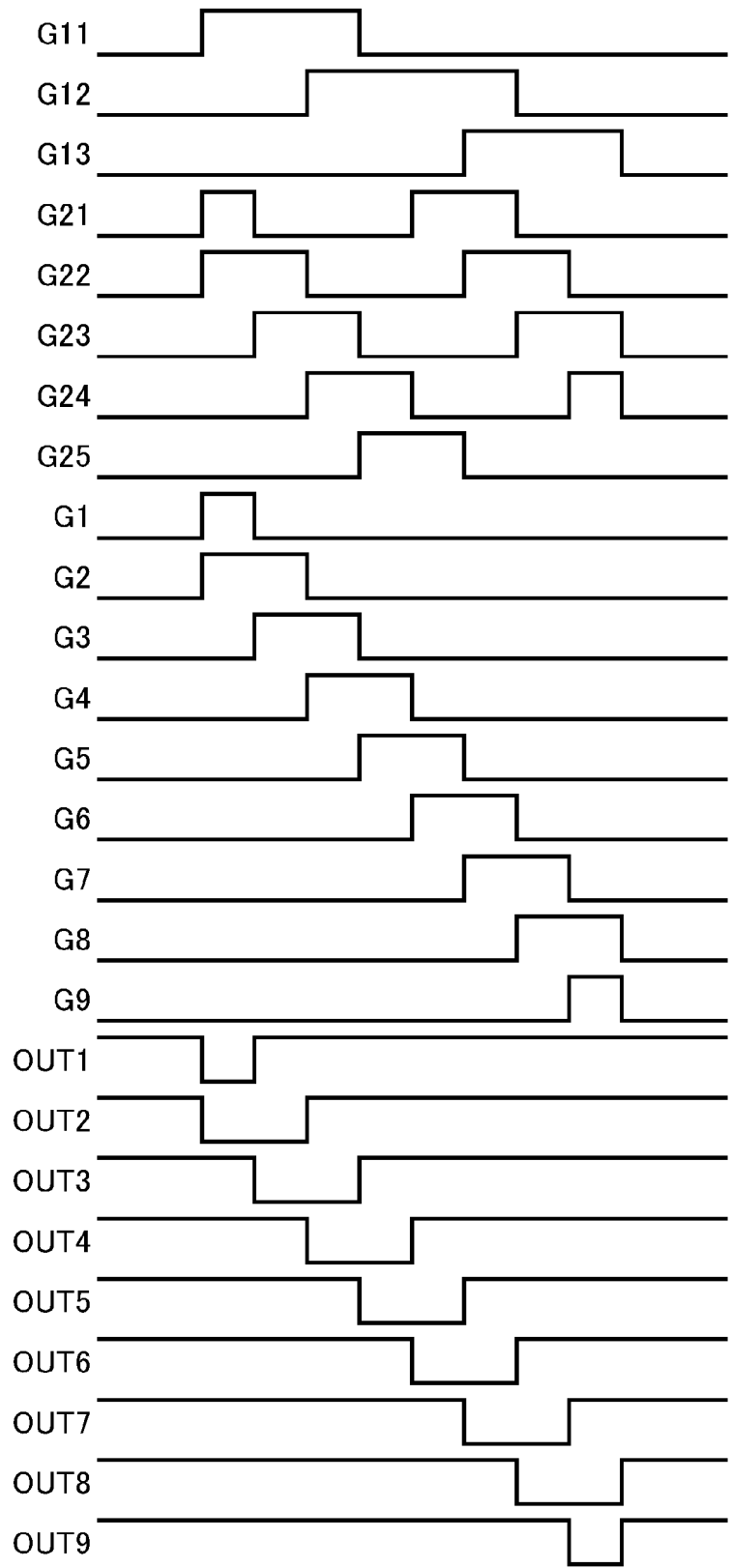
FIG. 16 is a timing chart showing another set of example signal waveforms of the circuit of FIG. 14.

FIG. 16 is a timing chart showing another set of example signal waveforms of the circuit of FIG. 14. FIG. 16 shows an example where the circuit of FIG. 14 is operated so that overlapping groups of two consecutive output signals are sequentially caused to be at the low potential. The logic section 170 outputs control signals G11-G13, G21-G25, and G1-G9 as shown in FIG. 16, whereby the circuit of FIG. 14 can easily perform operation so that overlapping groups of two consecutive output signals are sequentially caused to be at the low potential as with the circuit of FIG. 11.

Figure 17:
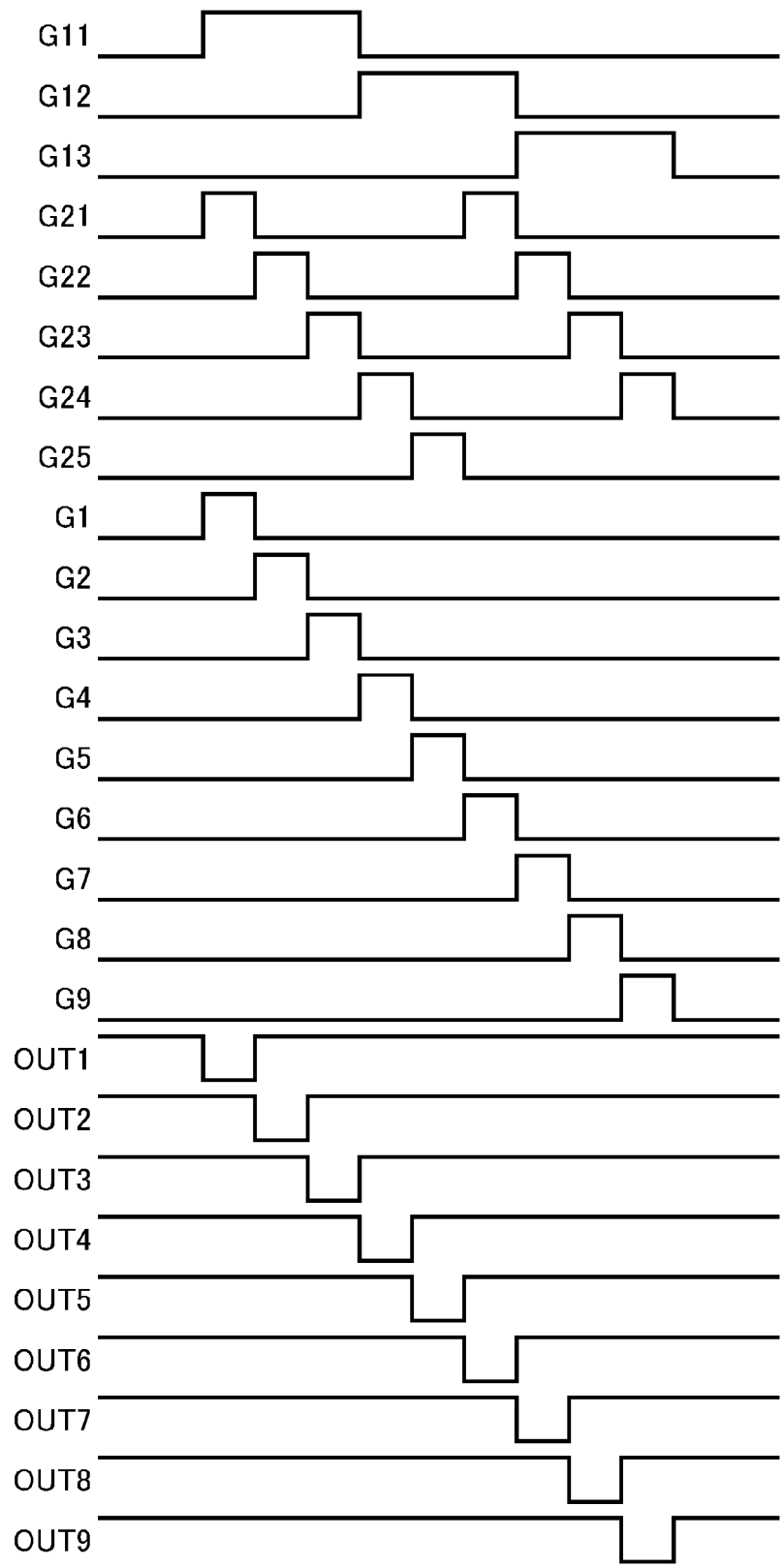
FIG. 17 is a timing chart showing example signal waveforms in the circuit of FIG. 14 when line-sequential scanning is performed.

FIG. 17 is a timing chart showing example signal waveforms in the circuit of FIG. 14 when line-sequential scanning is performed. The logic section 170 outputs control signals G11-G13, G21-G25, and G1-G9 as shown in FIG. 17, whereby the circuit of FIG. 14 can easily perform line-sequential scanning in which the output signals OUT1-OUT9 are sequentially (i.e., one at a time) caused to be at the low potential as in the circuit of FIG. 3.

According to the circuits of FIGS. 11 and 14, in a drive device having N output circuits, line-sequential scanning can be performed using (M+L) switching elements (PMOS transistors) which serve as high-side switching elements where the condition $\{M-(n-1)\} \times L \geq N$ is satisfied, and ($2 \times N$) rectifier elements (diodes). Without this embodiment, N high-side switching elements are required. Specifically, for example, when nine output circuits are provided as shown in FIG. 12, the number of required high-side switching elements is seven in this embodiment, but nine without this embodiment.

Although the number of rectifier elements increases, the circuit area of each rectifier element is sufficiently smaller than the circuit area of a switching element. As a practical matter, if a scan driver IC includes about 100 output circuits, the number of switching elements is, for example, 21 (L=10 and M=11), and therefore, the number of switching elements can be reduced by a factor of about 5. Therefore, the circuit area of the scan driver IC can be sufficiently reduced irrespective of the increase in the number of rectifier elements.

Figure 18:
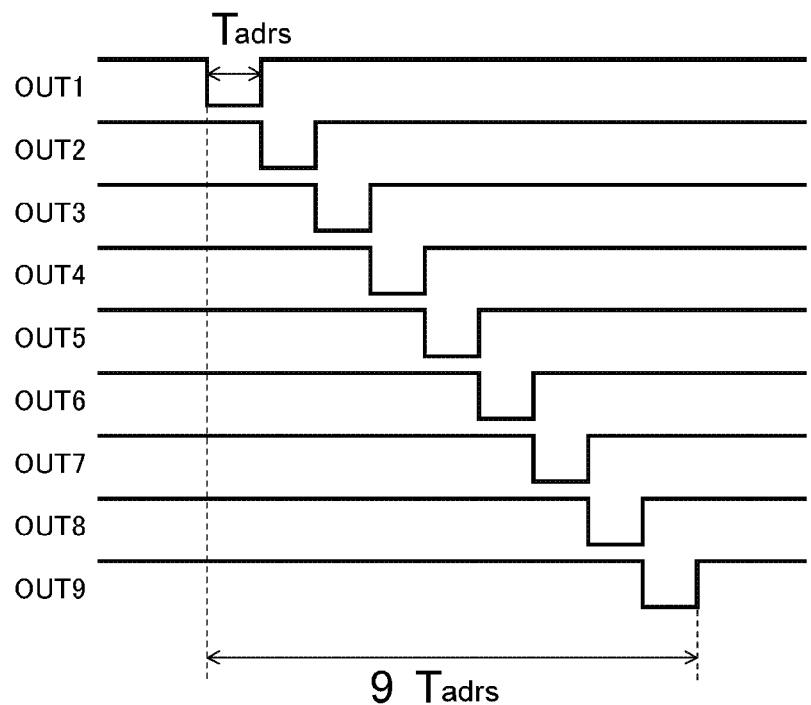
FIG. 18 is a timing chart showing a portion of FIG. 5.

FIG. 18 is a timing chart showing a portion of FIG. 5. In the above description, pulses are output as the output signals OUT1-OUT9 sequentially (i.e., one at a time) as shown in FIG. 18. In this case, it takes 9 Tadrs, where Tadrs is an address period, to output all pulses, i.e., the output signals OUT1-OUT9. A specific example where the time required for scanning operation is reduced by performing simultaneous drive in combination with line-sequential scanning, or repeatedly performing only simultaneous drive, on the loads C1-C9 of scan lines of the display panel 194, will be described hereinafter.

Figure 19:
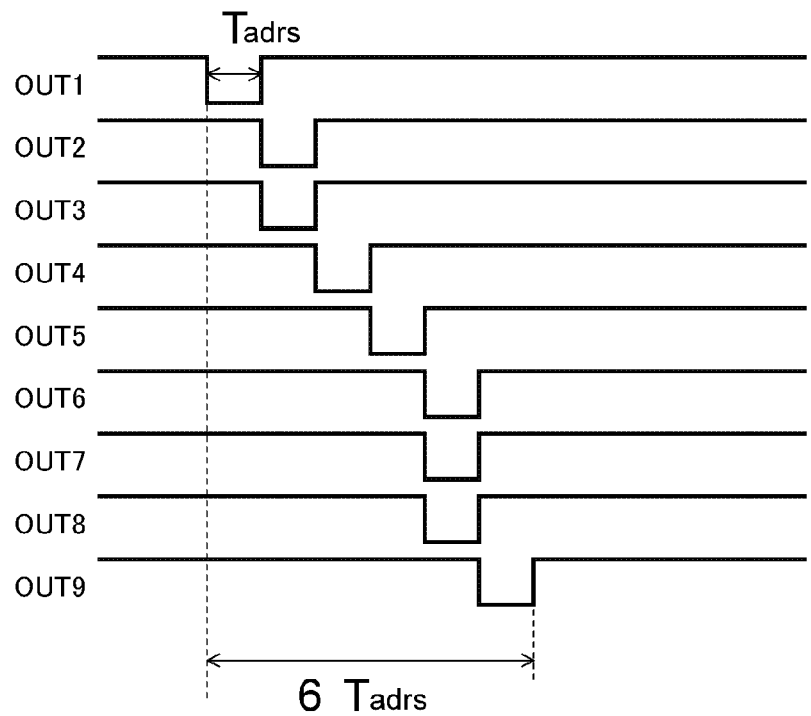
FIG. 19 is a timing chart showing an example in which simultaneous drive is performed in combination with line-sequential scanning.
Figure 20:
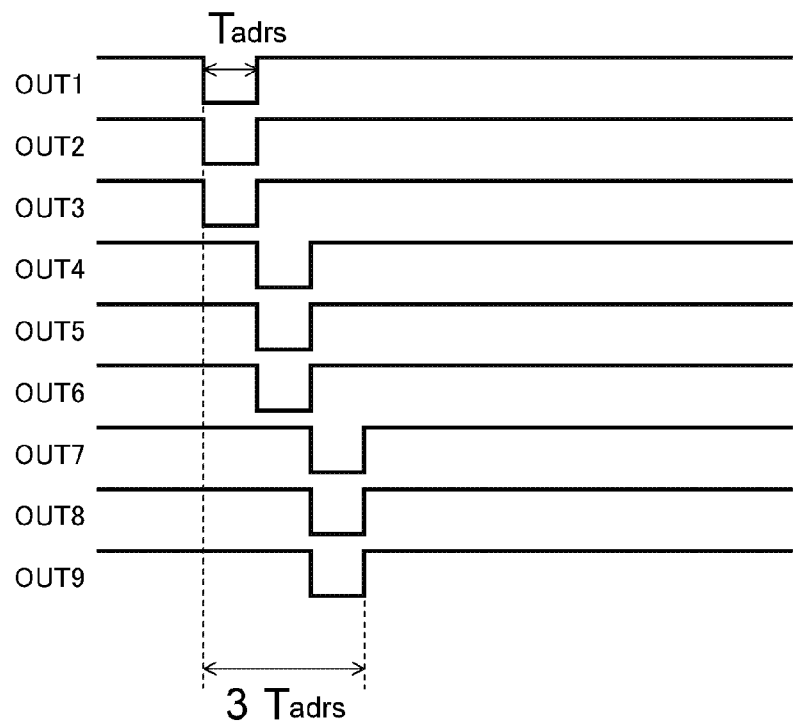
FIG. 20 is a timing chart showing an example in which simultaneous drive on three scan lines is repeatedly performed.
Figure 21:
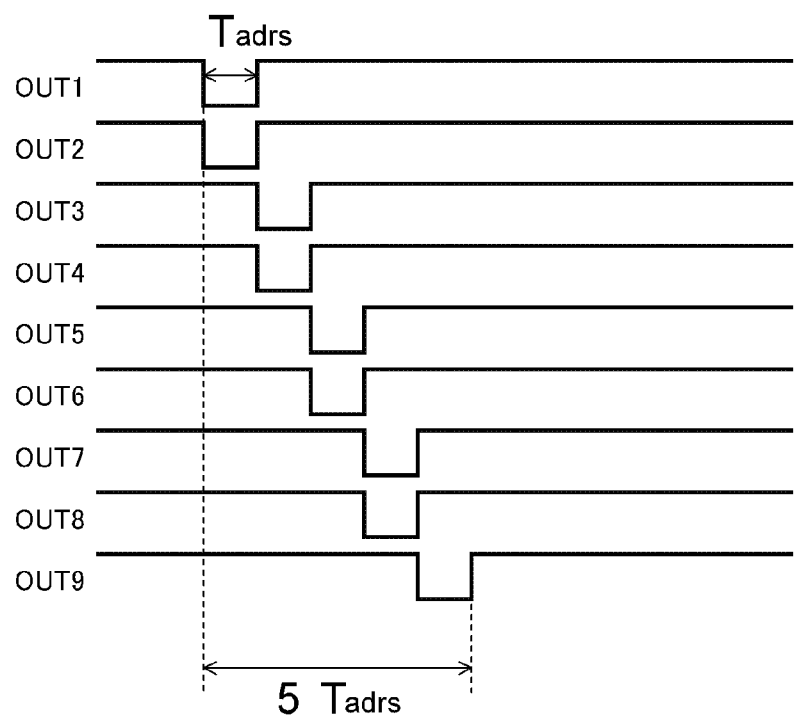
FIG. 21 is a timing chart showing an example in which simultaneous drive on two scan lines is repeatedly performed.

FIG. 19 is a timing chart showing an example in which simultaneous drive is performed in combination with line-sequential scanning. FIG. 20 is a timing chart showing an example in which simultaneous drive on three scan lines is repeatedly performed. FIG. 21 is a timing chart showing an example in which simultaneous drive on two scan lines is repeatedly performed. For example, according to the circuit of FIG. 14, simultaneous drive on three consecutive scan lines can be invariably performed, and therefore, any of the operations of FIGS. 19-21 can be performed. The time required to output all pulses, i.e., the output signals OUT1-OUT9, is 6 Tadrs in the case of FIG. 19, 3 Tadrs in the case of FIG. 20, and 5 Tadrs in the case of FIG. 21, which are shorter than that in the case of FIG. 18. For example, according to the circuit of FIG. 11, simultaneous drive on two consecutive scan lines can be invariably performed, and therefore, the operation of FIG. 21 can be performed.

The address period Tadrs needs to be longer than or equal to a time length which is determined, depending on characteristics of a display panel to be driven. According to FIGS. 11 and 14, even if the address period Tadrs is kept constant, the time required for scanning operation can be significantly reduced.

Although an example in which an NMOS transistor, a PMOS transistors, etc. are used as the switching elements has been described above, other switching elements, such as a bipolar transistor, an insulated gate bipolar transistor (IGBT), etc., may be instead used. Although an example in which a diode is used as the rectifier elements has been described above, a diode-connected transistor may be used as a portion of the rectifier elements.

In the above embodiments, the voltages VDDH and FGND may be interchanged. Note that, in this case, it is necessary that the direction of each diode be reversed, and each PMOS transistor be replaced with an NMOS transistor and each NMOS transistor be replaced with a PMOS transistor. The logic level of each signal in the output circuits 201, 401, 601, etc. of FIGS. 4, 7, 9, 11, and 14 is also reversed.

As described above, according to various embodiments of the present disclosure, the circuit area can be reduced, and therefore, the present disclosure is useful for drive devices etc.

The many features and advantages of the present disclosure are apparent from the written description, and thus, it is intended by the appended claims to cover all such features and advantages of the present disclosure. Further, since numerous modifications and changes will readily occur to those skilled in the art, it is not desired to limit the present disclosure to the exact configurations and operations as illustrated and described. Hence, all suitable modifications and equivalents may be contemplated as falling within the scope of the present disclosure.

What is claimed is:

1. A drive device comprising:
a first switch section including a plurality of switching elements each having a first and a second end;
a second switch section including a plurality of switching elements each having a first and a second end; and
a plurality of output circuits, wherein
each of the plurality of output circuits includes
a switching element having a first and a second end, a first voltage being supplied to the first end,
a first rectifier element having a current input terminal into which a current flows and a current output terminal from which a current flows out, the current output terminal being connected to the second end of the switching element of the each of the plurality of output circuits, and
a second rectifier element having a current input terminal into which a current flows and a current output terminal from which a current flows out, the current output terminal being connected to the second end of the switching element of the each of the plurality of output circuits,
a second voltage is supplied to the first end of each of the plurality of switching elements of the first switch section,
the second voltage is supplied to the first end of each of the plurality of switching elements of the second switch section, and
each of the plurality of output circuits corresponds to one of the plurality of switching elements of the first switch section and one of the plurality of switching elements of the second switch section, the second end of the one of the plurality of switching elements of the first switch section is connected to the current input terminal of the first rectifier element of the each of the plurality of output circuits, and the second end of the one of the plurality of switching elements of the second switch section is connected to the current input terminal of the second rectifier element of the each of the plurality of output circuits.

2. The drive device of claim 1, wherein
the drive device is controlled so that one of the plurality of switching elements of the first switch section and one of the plurality of switching elements of the second switch section are turned off, and the switching element of one of the plurality of output circuits corresponding to the one of the plurality of switching elements of the first switch section and the one of the plurality of switching elements of the second switch section is turned on.

3. The drive device of claim 1, wherein
the drive device is controlled so that one or two of the plurality of switching elements of the first switch section and two or more of the plurality of switching elements of the second switch section are turned off, and the switching element of one of the plurality of output circuits corresponding to any of the one or two of the plurality of switching elements of the first switch section and any of the two or more of the plurality of switching elements of the second switch section is turned on.

4. The drive device of claim 3, wherein
when the two of the plurality of switching elements of the first switch section are turned off, only one of the plurality of output circuits is connected to any of the two of the plurality of switching elements of the first switch section and one of the two or more of the plurality of switching elements of the second switch section.

5. The drive device of claim 1, wherein
a size of each of the plurality of switching elements of the first switch section is smaller than that of any of the plurality of switching elements of the second switch section.

6. The drive device of claim 1, further comprising:
a third switch section including a plurality of switching elements each having a first and a second end,
wherein
each of the plurality of output circuits further includes a third rectifier element having a current input terminal into which a current flows and a current output terminal from which a current flows out, the current output terminal being connected to the second end of the switching element of the each of the plurality of output circuits,
the second voltage is supplied to the first end of each of the plurality of switching elements of the third switch section, and
each of the plurality of output circuits corresponds to one of the plurality of switching elements of the third switch section, and the second end of the one of the plurality of switching elements of the third switch section is connected to the current input terminal of the third rectifier element of the each of the plurality of output circuits.

7. A display device comprising:
a display panel; and
a drive device configured to generate a plurality of output signals for driving the display panel,
wherein
the drive device includes
a first switch section including a plurality of switching elements each having a first and a second end,
a second switch section including a plurality of switching elements each having a first and a second end, and
a plurality of output circuits,
each of the plurality of output circuits includes
a switching element having a first and a second end, a first voltage being supplied to the first end,
a first rectifier element having a current input terminal into which a current flows and a current output terminal from which a current flows out, the current output terminal being connected to the second end of the switching element of the each of the plurality of output circuits, and a second rectifier element having a current input terminal into which a current flows and a current output terminal from which a current flows out, the current output terminal being connected to the second end of the switching element of the each of the plurality of output circuits, a second voltage is supplied to the first end of each of the plurality of switching elements of the first switch section, the second voltage is supplied to the first end of each of the plurality of switching elements of the second switch section, and each of the plurality of output circuits corresponds to one of the plurality of switching elements of the first switch section and one of the plurality of switching elements of the second switch section, the second end of the one of the plurality of switching elements of the first switch section is connected to the current input terminal of the first rectifier element of the each of the plurality of output circuits, the second end of the one of the plurality of switching elements of the second switch section is connected to the current input terminal of the second rectifier element of the each of the plurality of output circuits, and one of the plurality of output signals is output from the second end of the switching element of the each of the plurality of output circuits.

* * * * *